(12) United States Patent
Magklis et al.

(10) Patent No.: US 11,327,752 B2
(45) Date of Patent: May 10, 2022

(54) ELEMENT BY VECTOR OPERATIONS IN A DATA PROCESSING APPARATUS

(71) Applicant: ARM LIMITED, Cambridge (GB)

(72) Inventors: Grigorios Magklis, Cambridge (GB); Nigel John Stephens, Cambridge (GB); Jacob Eapen, Cambridge (GB); Mbou Eyole, Cambridge (GB); David Hennah Mansell, Cambridge (GB)

(73) Assignee: ARM LIMITED, Cambridge (GB)

( * ) Notice: Subject to any disclaimer, the term of this patent is extended or adjusted under 35 U.S.C. 154(b) by 216 days.

(21) Appl. No.: 16/487,256

(22) PCT Filed: Feb. 2, 2018

(86) PCT No.: PCT/GB2018/050311
§ 371 (c)(1),
(2) Date: Aug. 20, 2019

(87) PCT Pub. No.: WO2018/154273
PCT Pub. Date: Aug. 30, 2018

(65) Prior Publication Data
US 2019/0377573 A1    Dec. 12, 2019

(30) Foreign Application Priority Data
Feb. 23, 2017    (GR) .............................. 20170100081

(51) Int. Cl.
*G06F 9/30*     (2018.01)
*G06F 17/16*    (2006.01)
*G06F 9/455*    (2018.01)

(52) U.S. Cl.
CPC ........ *G06F 9/3001* (2013.01); *G06F 9/30036* (2013.01); *G06F 9/30043* (2013.01);
(Continued)

(58) Field of Classification Search
None
See application file for complete search history.

(56) References Cited

U.S. PATENT DOCUMENTS 8,443,170 B2 * 5/2013 Wilder .................. G06F 9/3001
712/22
8,595,280 B2 * 11/2013 Symes .................. G06F 9/3001
708/523

(Continued)

FOREIGN PATENT DOCUMENTS

EP    1692612 B1 * 12/2012  .......... G06F 9/30112
EP    2 584 460        4/2013
(Continued)

OTHER PUBLICATIONS

'A Complex Arithmetic Digital Signal Processor Using Cordic Rotators' by S. Freeman et al., copyright IEEE, 1995. (Year: 1995).*
(Continued)

*Primary Examiner* — Steven G Snyder
(74) *Attorney, Agent, or Firm* — Nixon & Vanderhye, PC

(57) ABSTRACT

A data processing apparatus, a method of operating a data processing apparatus, a non-transitory computer readable storage medium, and an instruction are provided. The instruction specifies a first source register, a second source register, and an index. In response to the instruction control signals are generated, causing processing circuitry to perform a data processing operation with respect to each data group in the first source register and the second source register to generate respective result data groups forming a result of the data processing operation. Each of the first source register and the second source register has a size which is an integer multiple at least twice a predefined size of the data group, and each data group comprises a plurality of data elements. The operands of the data processing operation for each data group are a selected data element
(Continued)

identified in the data group of the first source register by the index and each data element in the data group of the second source register. A technique for element-by-vector operation which is readily scalable as the register width grows.

23 Claims, 22 Drawing Sheets

(52) U.S. Cl.
CPC ...... *G06F 9/30101* (2013.01); *G06F 9/30109* (2013.01); *G06F 9/30112* (2013.01); *G06F 9/30145* (2013.01); *G06F 9/45541* (2013.01); *G06F 17/16* (2013.01)

(56) References Cited

U.S. PATENT DOCUMENTS

| | | | | |
|---|---|---|---|---|
| 9,804,840 | B2* | 10/2017 | Bradbury | G06F 9/3016 |
| 10,503,502 | B2* | 12/2019 | Hughes | G06F 9/30101 |
| 2003/0097391 | A1* | 5/2003 | Saulsbury | G06F 7/5443 708/490 |
| 2005/0125631 | A1 | 6/2005 | Symes et al. | |
| 2010/0274990 | A1* | 10/2010 | Wilder | G06F 9/3001 712/22 |
| 2011/0106871 | A1* | 5/2011 | Symes | G06F 9/3887 708/603 |
| 2013/0290254 | A1* | 10/2013 | Ould-Ahmed-Vall | G06F 16/27 707/626 |
| 2013/0339664 | A1* | 12/2013 | Ould-Ahmed-Vall | G06F 9/30109 712/205 |
| 2014/0208079 | A1 | 7/2014 | Bradbury | |
| 2016/0179523 | A1 | 6/2016 | Ould-Ahmed-Vall | |
| 2016/0357563 | A1* | 12/2016 | Van Dalen | G06F 9/30032 |
| 2017/0103321 | A1* | 4/2017 | Henry | G06N 3/08 |
| 2017/0286112 | A1* | 10/2017 | Espasa | G06F 9/3853 |
| 2017/0308383 | A1* | 10/2017 | Espasa | G06F 9/30145 |
| 2018/0189640 | A1* | 7/2018 | Henry | G06F 9/3001 |
| 2018/0225116 | A1* | 8/2018 | Henry | G06F 9/30076 |
| 2018/0276534 | A1* | 9/2018 | Henry | G06F 9/3887 |
| 2019/0369989 | A1* | 12/2019 | Mansell | G06F 9/30112 |
| 2020/0218538 | A1* | 7/2020 | Mansell | G06F 9/30109 |

FOREIGN PATENT DOCUMENTS

| | | | | |
|---|---|---|---|---|
| EP | 3001306 | A1 * | 3/2016 | ......... G06F 9/30036 |
| EP | 3001307 | A1 * | 3/2016 | ......... G06F 9/30043 |
| EP | 1692613 | B1 * | 3/2018 | ......... G06F 9/30032 |
| EP | 1692611 | B1 * | 8/2018 | ......... G06F 9/30032 |
| GB | 2458665 | A * | 9/2009 | ........... G06F 9/3001 |
| GB | 2464292 | A * | 4/2010 | ........... G06F 9/3001 |
| GB | 2474901 | A * | 5/2011 | ........... G06F 9/3893 |
| JP | H0589159 | A | 4/1993 | |
| JP | 2005174292 | A * | 6/2005 | ......... G06F 9/30025 |
| JP | 2008077663 | | 4/2008 | |
| JP | 2015158940 | | 9/2015 | |
| JP | 2016507831 | | 3/2016 | |
| WO | WO-2013095607 | A1 * | 6/2013 | ......... G06F 9/30036 |
| WO | WO-2013095618 | A1 * | 6/2013 | ......... G06F 21/6254 |
| WO | WO-2018154268 | A1 * | 8/2018 | ........... G06F 9/3001 |
| WO | WO-2018154269 | A1 * | 8/2018 | ......... G06F 9/30109 |

OTHER PUBLICATIONS

'The pros and cons of using a virtualized machine' by David Ward, Mar. 10, 2015. (Year: 2015).*
'New "Bulldozer" and "Piledriver" Instructions' by Brent Hollingsworth, Advanced Micro Devices, Inc., Oct. 2012. (Year: 2012).*
Office Action for EP Application No. 18704067.0 dated Jul. 7, 2020, 4 pages.
International Search Report and Written Opinion of the ISA for PCT/GB2018/050311 dated May 8, 2018, 12 pages.
European Office Action for Application No. 18704067.0 dated Nov. 30, 2021, 4 pages.
Office Action for IL Application No. 267998 dated Jul. 25, 2021, 3 pages.
Indian Office Action for Application No. 201947038038 dated Jan. 14, 2022, 6 pages.
Taiwan Office Action for Application No. 107106120 with English translation dated Jan. 11, 2022, 20 pages.
Japanese Office Action for Application No. 2019544057 with English translation dated Jan. 18, 2022, 7 pages.

* cited by examiner

ELEMENT BY VECTOR OPERATIONS IN A DATA PROCESSING APPARATUS

This application is the U.S. national phase of International Application No. PCT/GB2018/050311 filed Feb. 2, 2018 which designated the U.S. and claims priority to GR 20170100081 filed Feb. 23, 2017, the entire contents of which are hereby incorporated by reference.

The present disclosure is concerned with data processing. In particular it is concerned with a data processing apparatus which performs element-by-vector operations.

A data processing apparatus may be required to perform arithmetic operations, which can include matrix multiply operations. These operations can find applicability in a variety of contexts. One function which may need to be implemented to support such matrix multiplies is the ability to support an operation combining a single element and an entire vector, for example multiplying all the elements of one vector by a single element of another vector. However, existing techniques to provide such functionality do not scale well to large vectors.

At least one example described herein provides a data processing apparatus comprising: register storage circuitry having a plurality of registers; decoder circuitry responsive to a data processing instruction to generate control signals, the data processing instruction specifying in the plurality of registers: a first source register, a second source register, and an index, wherein each of the first source register and the second source register has a size which is an integer multiple at least twice a predefined size of a data group, and each data group comprises a plurality of data elements; and processing circuitry responsive to the control signals to perform a data processing operation with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example described herein provides a method of data processing comprising: decoding a data processing instruction to generate control signals, the data processing instruction specifying in a plurality of registers: a first source register, a second source register, and an index, wherein each of the first source register and the second source register has a size which is an integer multiple at least twice a predefined size of a data group, and each data group comprises a plurality of data elements; and performing a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example described herein provides a computer-readable storage medium storing in a non-transient fashion a program comprising at least one data processing instruction which when executed by a data processing apparatus causes: generation of control signals in response to the data processing instruction, the data processing instruction specifying in a plurality of registers: a first source register, a second source register, and an index, wherein each of the first source register and the second source register has a size which is an integer multiple at least twice a predefined size of a data group, and each data group comprises a plurality of data elements; and performance of a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example described herein provides a data processing apparatus comprising: means for storing data in a plurality of registers; means for decoding a data processing instruction to generate control signals, the data processing instruction specifying in the means for storing data: a first source register, a second source register, and an index, wherein each of the first source register and the second source register has a size which is an integer multiple at least twice a predefined size of a data group, and each data group comprises a plurality of data elements; and means for performing a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

The present invention will be described further, by way of example only, with reference to embodiments thereof as illustrated in the accompanying drawings, in which:

FIG. 1 schematically illustrates a data processing apparatus which can embody various examples of the present techniques;

FIG. 2 schematically illustrates the use of a data preparation instruction in one embodiment;

FIG. 3 schematically illustrates a variant on the embodiment of FIG. 2;

FIG. 4A schematically illustrates an example data processing instruction and FIG. 4B shows the implementation of the execution of that data processing instruction in one embodiment;

FIGS. 5A and 5B schematically illustrate two ways in which the routing of data elements to operational units may be provided in some embodiments;

FIGS. 6A and 6B schematically illustrate two further examples of the data processing instruction discussed with reference to FIGS. 4A and 4B and their execution;

FIG. 7A schematically illustrates an example data processing instruction and FIG. 7B shows the implementation of the execution of that data processing instruction in one embodiment;

FIG. 8 shows a sequence of steps which are taken according to the method of one embodiment;

FIG. 9A schematically illustrates the execution of a data processing instruction according to one embodiment and FIG. 9B shows two examples of such an instruction;

FIG. 10 schematically illustrates some variations in embodiments of the execution of the data processing instructions of FIG. 9B;

FIG. 11 schematically illustrates a more complex example with two 128-bit source registers for a "dot product" data processing instruction in one embodiment;

Figure 15A:
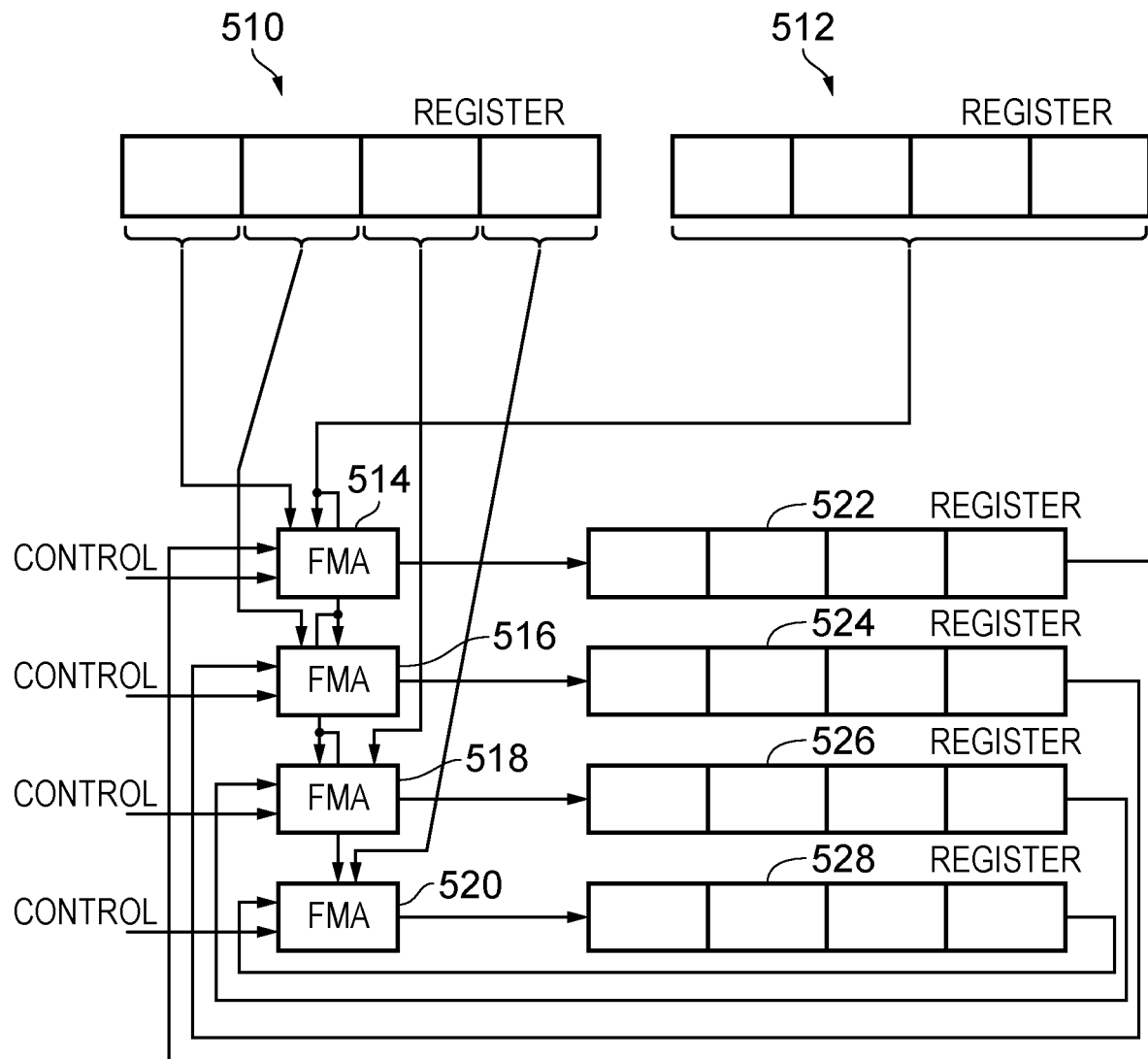
Figure 15B:
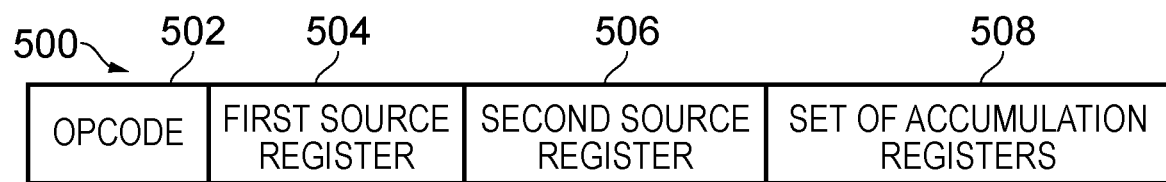
Figure 16:
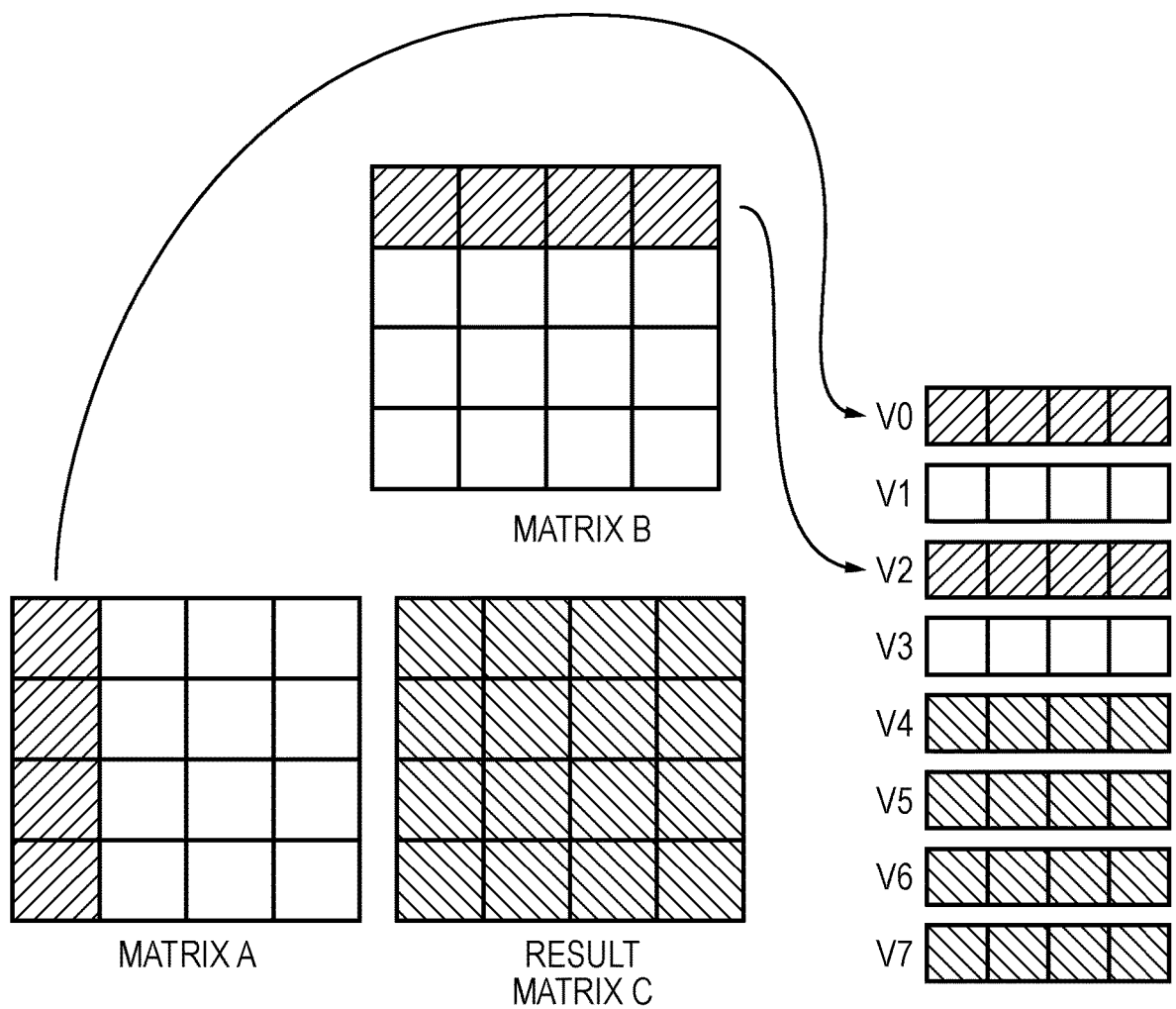
Figure 17:
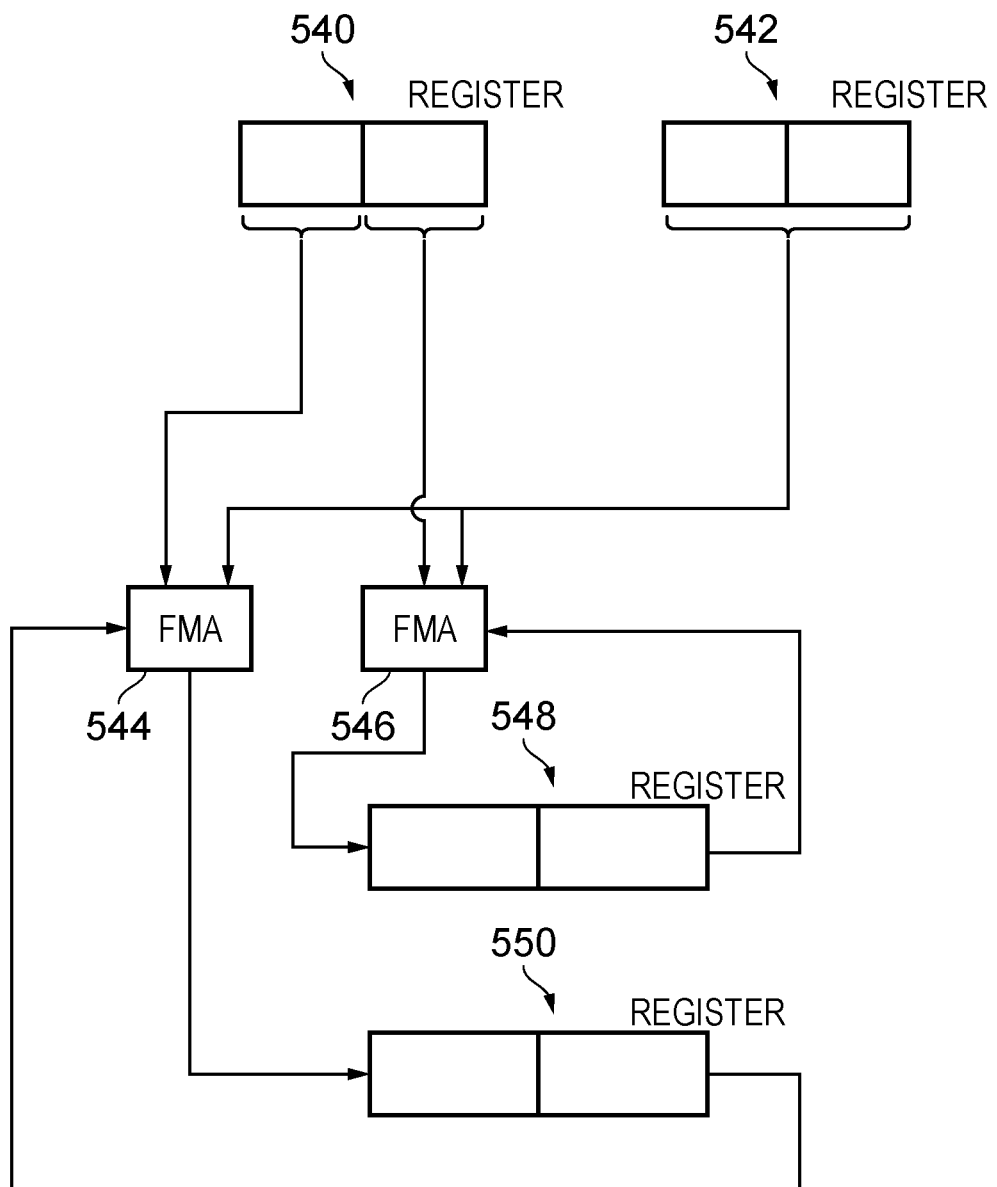
Figure 18:
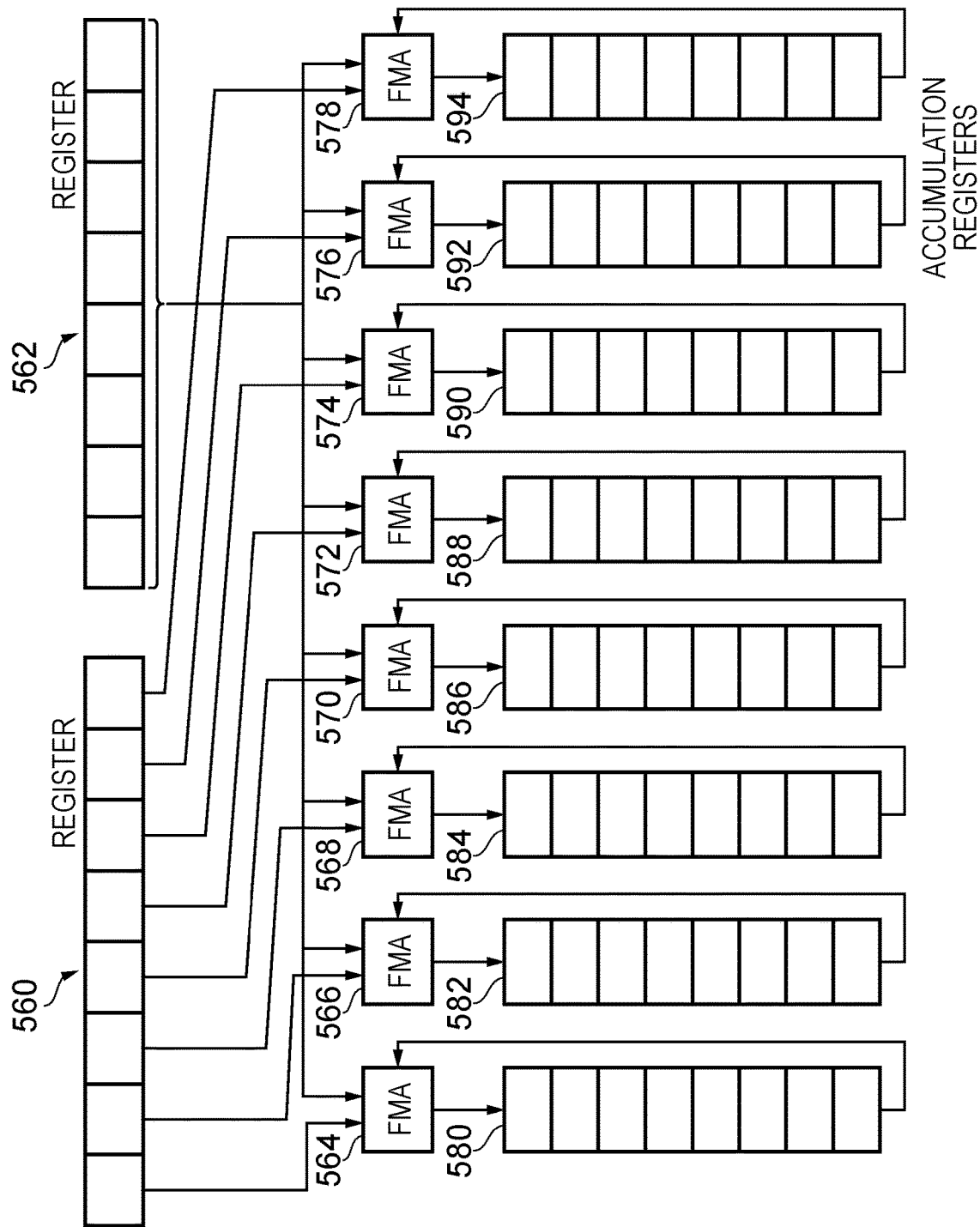
Figure 19:
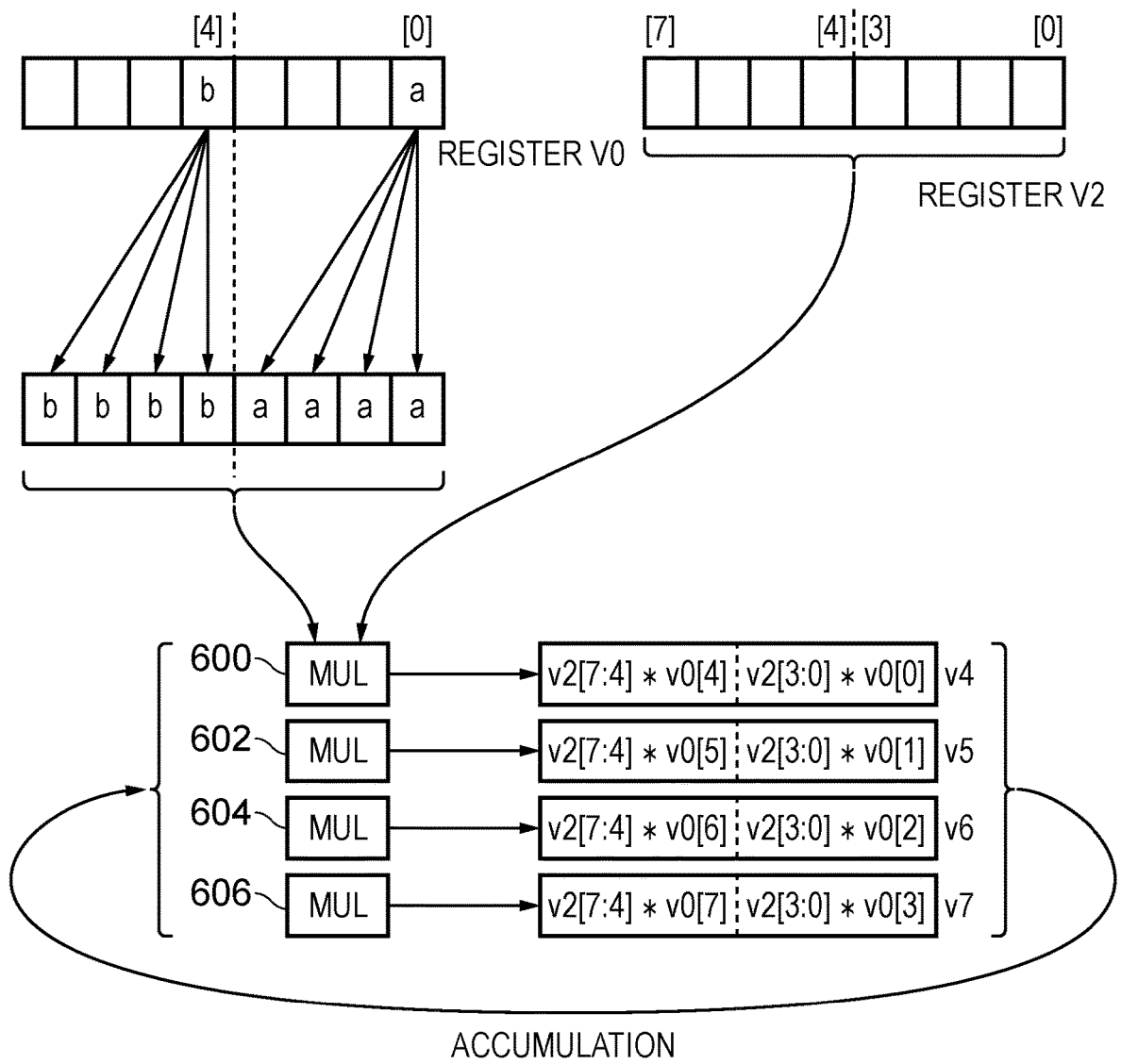
Figure 20:
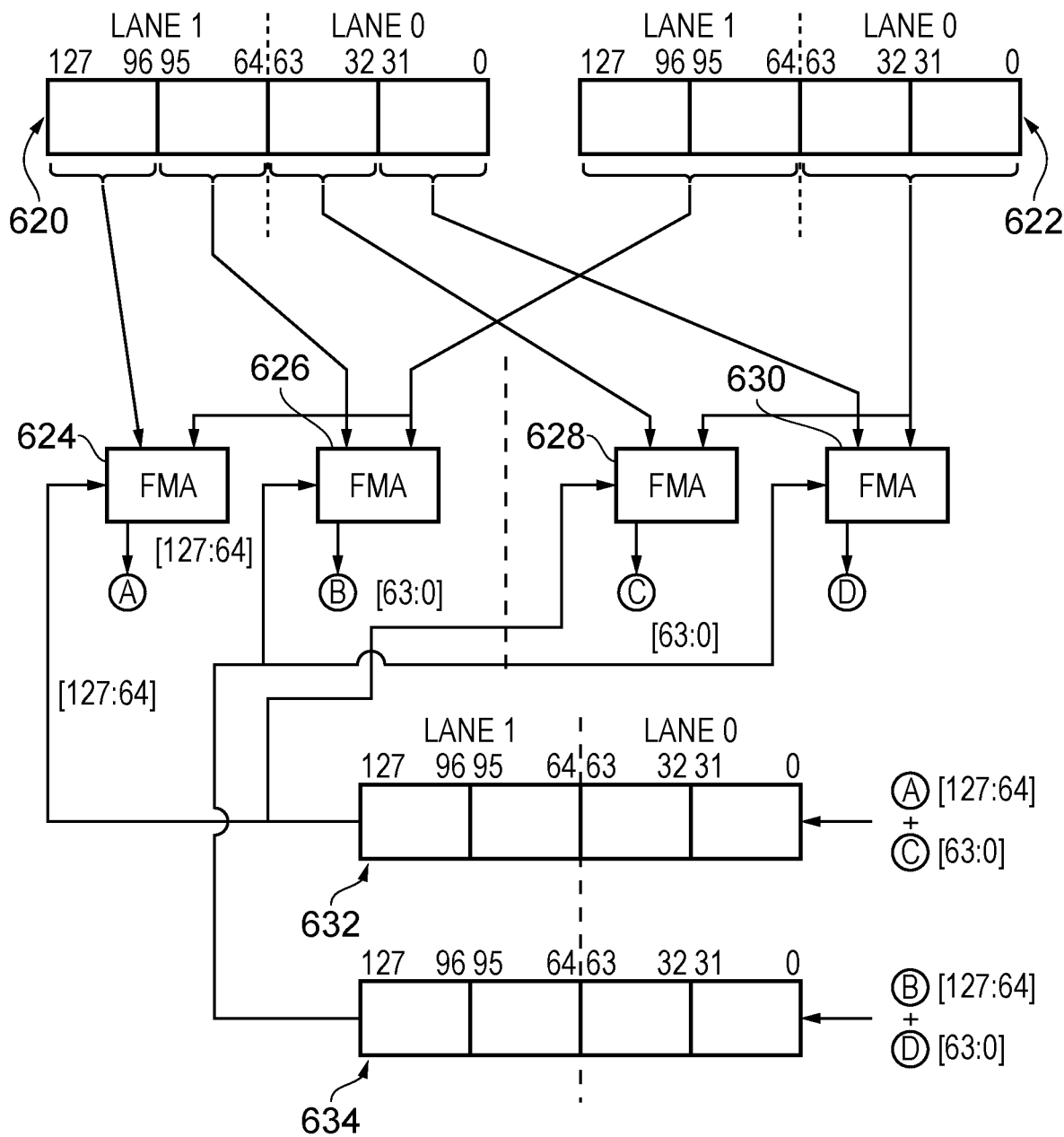
Figure 21:
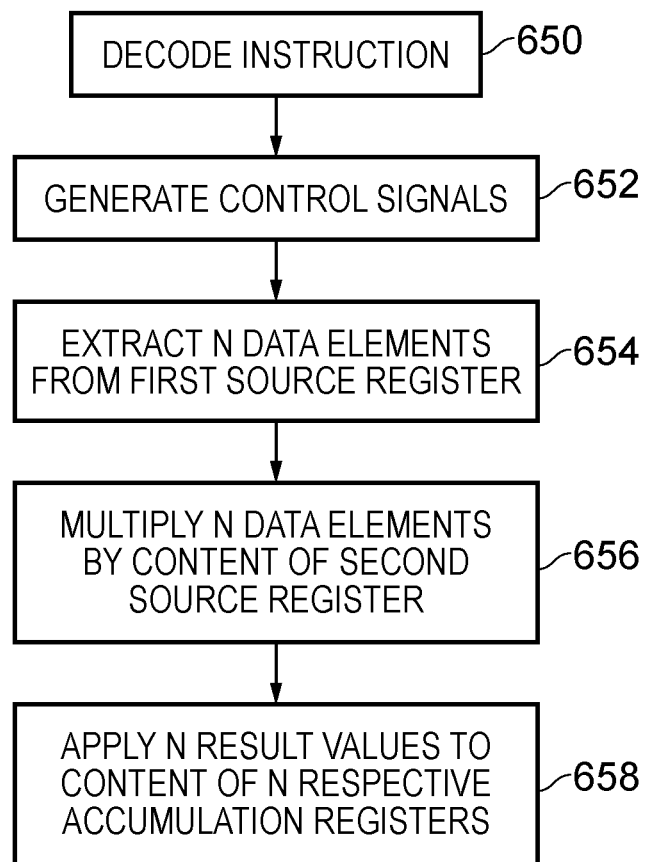
Figure 22:
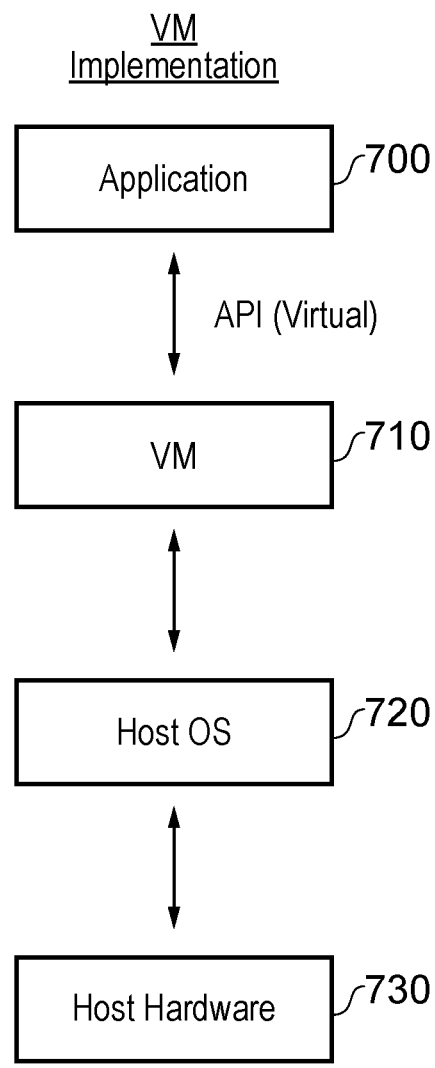

FIG. 15A schematically illustrates the execution of a data processing instruction provided by some embodiments and FIG. 15B shows a corresponding example instruction;

FIG. 16 shows an example visualisation of the embodiment of FIG. 15A, in the form of a simple matrix multiply operation;

FIG. 17 shows a simpler variant of the examples shown in FIG. 15A, where only two data elements are derived from each of the first and second source registers;

FIG. 18 shows another variant of the example shown in FIG. 15A, where more data elements are extracted from each of the source registers;

FIG. 19 shows an example embodiment of the execution of a data processing instruction, giving more detail of some specific multiplication operations which are performed;

FIG. 20 shows an example embodiment of the execution of a data processing instruction, where the content of two source registers are treated as containing data elements in two independent lanes;

FIG. 21 shows a sequence of steps which are taken according to the method of one embodiment; and FIG. 22 shows a virtual machine implementation in accordance with one embodiment.

At least one example embodiment described herein provides a data processing apparatus comprising: register storage circuitry having a plurality of registers; decoder circuitry responsive to a data processing instruction to generate control signals, the data processing instruction specifying in the plurality of registers: a first source register, a second source register, and an index, wherein each of the first source register and the second source register has a size which is an integer multiple at least twice a predefined size of a data group, and each data group comprises a plurality of data elements; and processing circuitry responsive to the control signals to perform a data processing operation with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

The instruction provided thus causes performance of a data processing operation on the vector elements of each data group in the first source register with a selected element from the corresponding data group in the second source register. The immediate index value is used to select the data element inside each element group in the first source register (i.e. the same element position in all groups). In other words, the instruction causes performance of an element-by-vector operation inside a group of elements, and the exact same operation (including the element selection) is replicated across each group in the vector. This provides an efficient mechanism for the implementation of such element-by-vector operation, especially as the register width (i.e. the vector length) grows, since the technique is readily scalable. Moreover, it should be noted that such a grouped element-by-vector instruction can generally be expected to be implementable as a single micro-operation in a data processing apparatus, without the extra latency compared to an equivalent normal vector operation, because the selection and replication of the processed data elements is defined and implemented at the "data group" level, which indeed can be defined to be limited to size for which such micro-operation implementation is possible.

The data processing apparatus may be arranged in a variety of ways to support the execution of this data processing instruction, such as in particular the manner in which the selected data element identified in the data group of the first source register by the index is manipulated and applied to each data element in the data group of the second source register. In some embodiments the processing circuitry comprises data element manipulation circuitry responsive to the control signals to supply multiple instances of the selected data element to multiple data operation circuits, wherein each data operation circuit is responsive to the control signals to perform the data processing operation with respect to a respective data group in the first source register and the second source register.

Whilst the source registers used by the data processing instruction may be freely specified, and the present techniques do not impose constraints on a format that the data values therein must match, the present techniques nevertheless have identified that the execution of the data processing instruction may be enhanced by causing the content of the source registers to take a particular format in advance. Accordingly in some embodiments the decoder circuitry is responsive to a data preparation instruction to generate further control signals, the data preparation instruction specifying a memory location and a target register, and wherein the processing circuitry is responsive to the further control signals to retrieve a subject data group item having the predefined size from the memory location and to fill the target register by replication of the subject data group item. In other words the present techniques provide another instruction, a data preparation instruction, arranged to retrieve a specified subject data group item and to replicate it across the width of the target register. The target register may be the first source register. Hence, the content of the first source register can be set up in advance by the data preparation instruction, such that the selected data element identified in the data group of the first source register by the index is already replicated at that position across the data groups of the first source register, before execution of the subsequent data processing instruction The integer multiple, defining the size ratio between each of the first source register and the second source register and the predefined size of a data group (at least twice that predefined size), may be variously defined and held in the data processing apparatus, but in some embodiments the register storage circuitry comprises a control register to store an indication of the integer multiple.

Further, the present techniques provide that a dedicated control instruction may be provided to allow amendment of this integer multiple, and in some embodiments the decoder circuitry is responsive to a control instruction to amend the indication of the integer multiple up to a predefined maximum value for the data processing apparatus.

The result of the data processing operation may be used in various ways, but in some embodiments the data processing instruction further specifies a result register in the plurality of registers, and the processing circuitry is further responsive to the control signals to apply the result of the data processing operation to the result register. The processing circuitry may be responsive to the control signals to store the result of the data processing operation in the result register. Alternatively, the processing circuitry may be responsive to the control signals to apply the result of the data processing operation to the second source register. In other words, the second source register may provide an accumulate register.

The data processing operation may only take content of the first source register and the second source register (and the immediate index value) as its operands, but is not limited to these operands and in some embodiments the data processing instruction further specifies at least one further source register in the plurality of registers, wherein the processing circuitry is responsive to the control signals to perform the data processing operation with further respect to each said data group in the at least one further source register to generate the respective result data groups forming the result of the data processing operation, and wherein operands of the data processing operation for each said data group further comprise each data element in the data group of the at least one further source register.

This further source register may play a variety of roles in the data processing operation. In some embodiments the processing circuitry is responsive to the control signals to accumulate the result of the data processing operation with previous content in the at least one further source register.

The data processing operation may be an arithmetic operation, for example it may be a multiply operation. The data processing operation may be a dot product operation comprising: extracting at least a first data element and a second data element from each of the first source register and the second source register; performing multiply operations of multiplying together at least first data element pairs and second data element pairs; and summing results of the multiply operations.

In some embodiments the multiply operations comprise multiplying together first data element pairs, second data element pairs, third data element pairs and fourth data element pairs.

In some embodiments the data processing instruction further specifies an accumulation register in the plurality of registers and the data processing operation is a dot product and accumulate operation which further comprises: loading an accumulator value from the accumulator register; summing the results of the multiply operations with the accumulator value; and storing a result of the summing to the accumulator register.

In some embodiments the data processing operation is a multiply-accumulate operation.

In some embodiments the data element in each said data group in the first source register and the second source register is a pair of data values representing a complex number and the data processing operation is a multiply-accumulate of complex numbers. In other words a "complex pair" (represented by two individual data values) may be treated as a data element by the present techniques, such that the described element-by-vector operations may also be applied to complex numbers. A dedicated corresponding instruction can thus also be provided in order to identify complex elements which are to be subject to the data processing operation acting on complex values (for example a multiply accumulate of complex numbers).

In some embodiments the data processing instruction further specifies a rotation parameter, wherein the processing circuitry is responsive to the rotation parameter to perform the multiply-accumulate of complex numbers using a selected permutation of the data values and their signs which are subject to the data processing operation. This lends flexibility to the variety of complex number operations which can be performed by means of the data processing instruction and for example allows the subject complex pair data values to be provided without signs, and yet for each rotational permutation of the signs of the complex pair data values to be directly available to the programmer.

In some embodiments the data processing operation is a logical operation.

At least one example embodiment described herein provides a method of data processing comprising: decoding a data processing instruction to generate control signals, the data processing instruction specifying in a plurality of registers: a first source register, a second source register, and an index, wherein each of the first source register and the second source register has a size which is an integer multiple at least twice a predefined size of a data group, and each data group comprises a plurality of data elements; and performing a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example embodiment described herein provides a computer-readable storage medium storing in a non-transient fashion a program comprising at least one data processing instruction which when executed by a data processing apparatus causes: generation of control signals in response to the data processing instruction, the data processing instruction specifying in a plurality of registers: a first source register, a second source register, and an index, wherein each of the first source register and the second source register has a size which is an integer multiple at least twice a predefined size of a data group, and each data group comprises a plurality of data elements; and performance of a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example embodiment described herein provides a data processing apparatus comprising: means for storing data in a plurality of registers; means for decoding a data processing instruction to generate control signals, the data processing instruction specifying in the means for storing data: a first source register, a second source register, and an index, wherein each of the first source register and the second source register has a size which is an integer multiple at least twice a predefined size of a data group, and each data group comprises a plurality of data elements; and means for performing a data processing operation in response to the control signals with respect to each said data group in the first source register and the second source register to generate respective result data groups forming a result of the data processing operation, wherein operands of the data processing operation for each said data group are a selected data element identified in the data group of the first source register by the index and each data element in the data group of the second source register.

At least one example embodiment described herein provides a virtual machine provided by a computer program executing upon a data processing apparatus, said virtual machine providing an instruction execution environment corresponding to one of the above-mentioned data processing apparatuses.

Some particular embodiments will now be described with reference to the figures.

Figure 1:
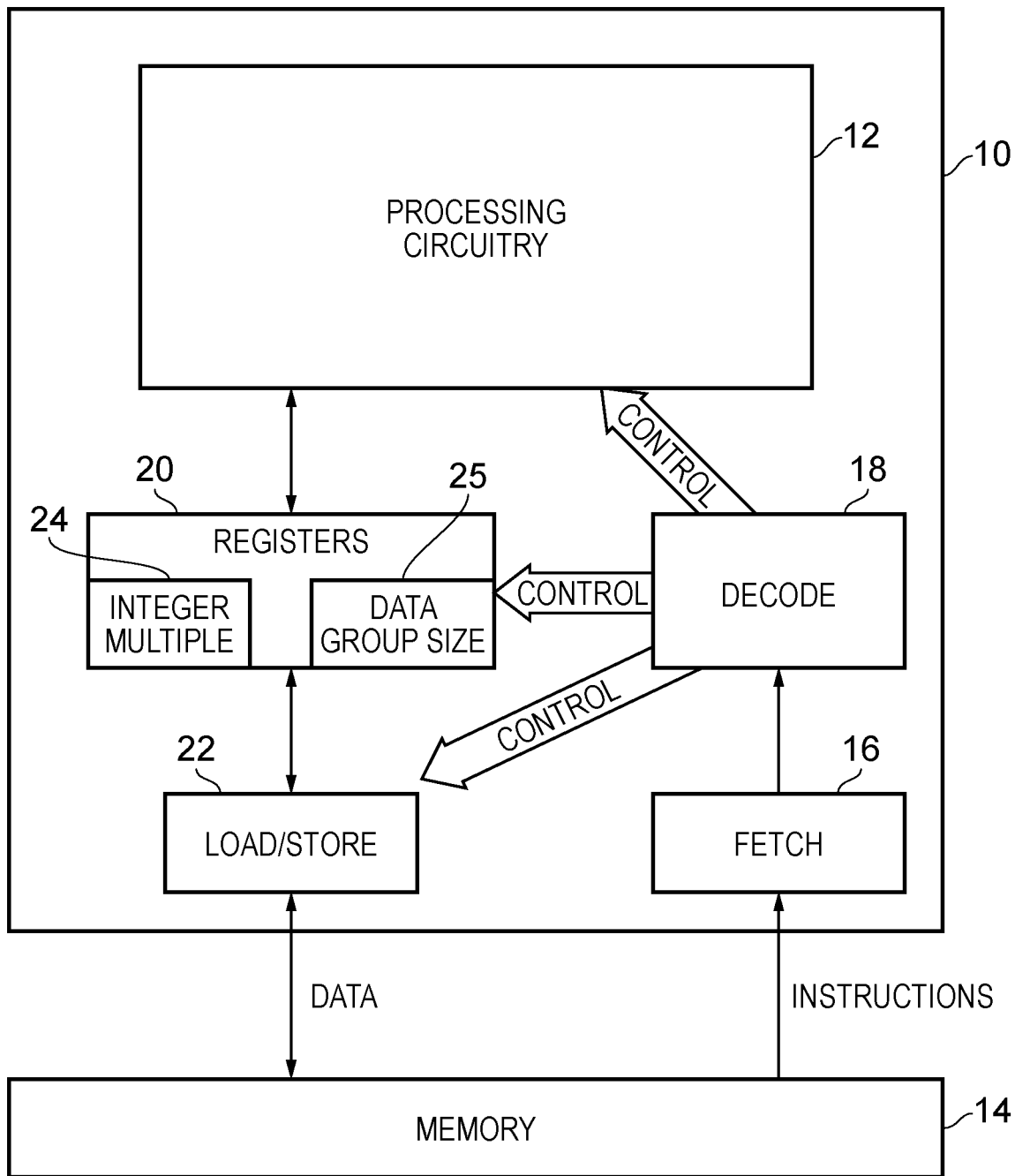

FIG. 1 schematically illustrates a data processing apparatus which may embody various examples of the present techniques. The data processing apparatus comprises processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Further instructions retrieved by the fetch circuitry 16 are passed to the decode circuitry 18, which generates control signals which are arranged to control various aspects of the configuration and operation of the processing circuitry 12. A set of registers 20 and a load/store unit 22 are also shown. One of ordinary skill in the art will be familiar with the general configuration which FIG. 1 represents and further detail description thereof is dispensed herewith merely for the purposes of brevity. The registers 20, in the embodiments illustrated in FIG. 1, can comprise storage for one or both of an integer multiple 24 and a data group 25 size, the use of which will be described in more detail below with reference to some specific embodiments. Data required by the processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2:
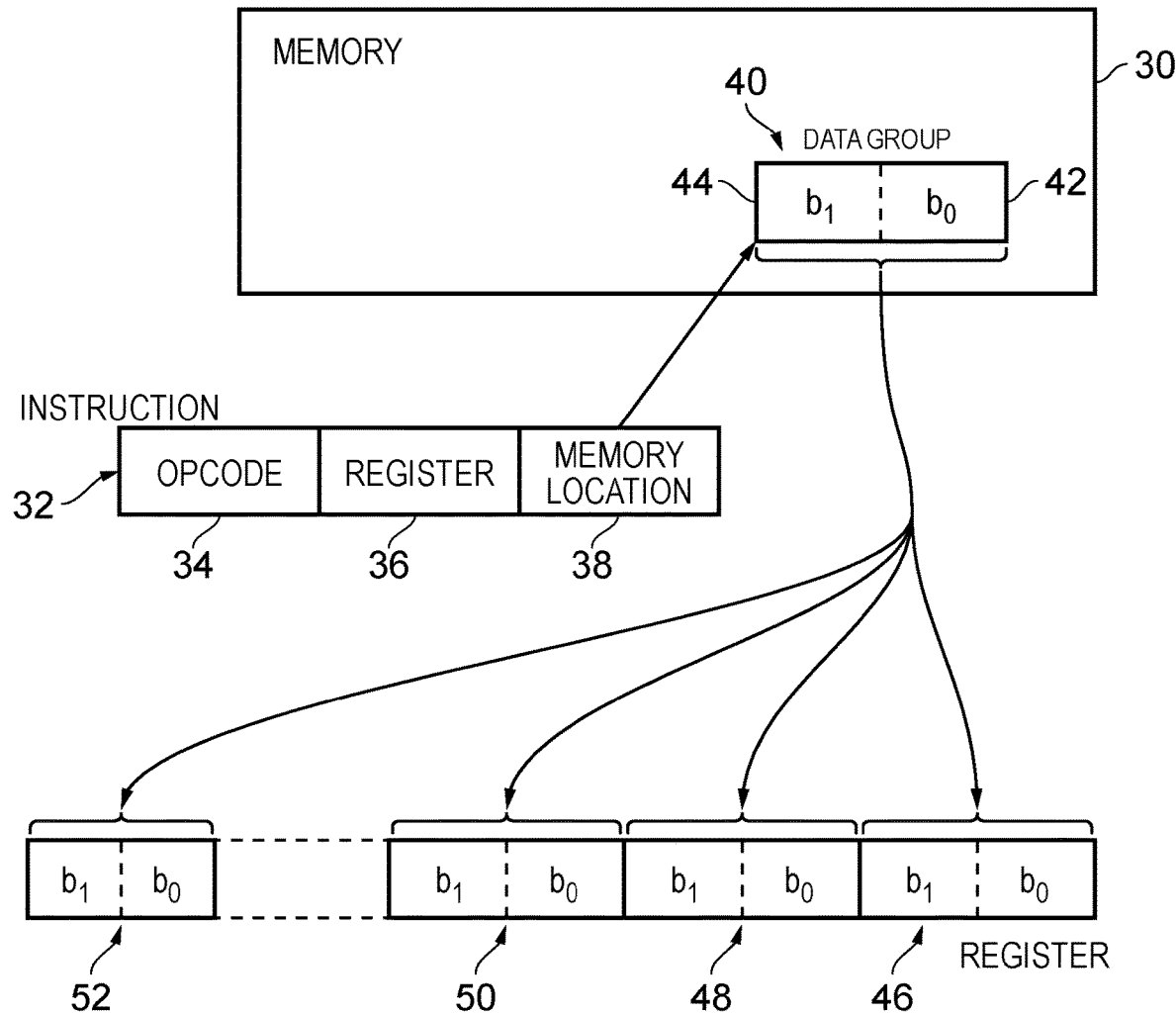

FIG. 2 schematically illustrates the use of a data preparation instruction 32. The data preparation instruction 32 comprises an opcode portion 34 (defining it as a data preparation instruction), a register specifier 36, and a memory location specifier 38. Execution of this instruction by the data processing apparatus of this embodiment causes a data group 40 to be identified which is stored in a memory 30 (referenced by the specified memory location and, for example extending over more than one address, depending on the defined data group size) and comprises (in this illustrated embodiment) two data elements b0 and b1 (labelled 42 and 44 in the figure). Further, execution of the instruction causes this data group 40 to be copied into the specified register and moreover to be replicated across the width of that register, as shown in FIG. 2 by the repeating data groups 46, 48, 50, and 52, each made up of the data elements b0 and b1.

Figure 3:
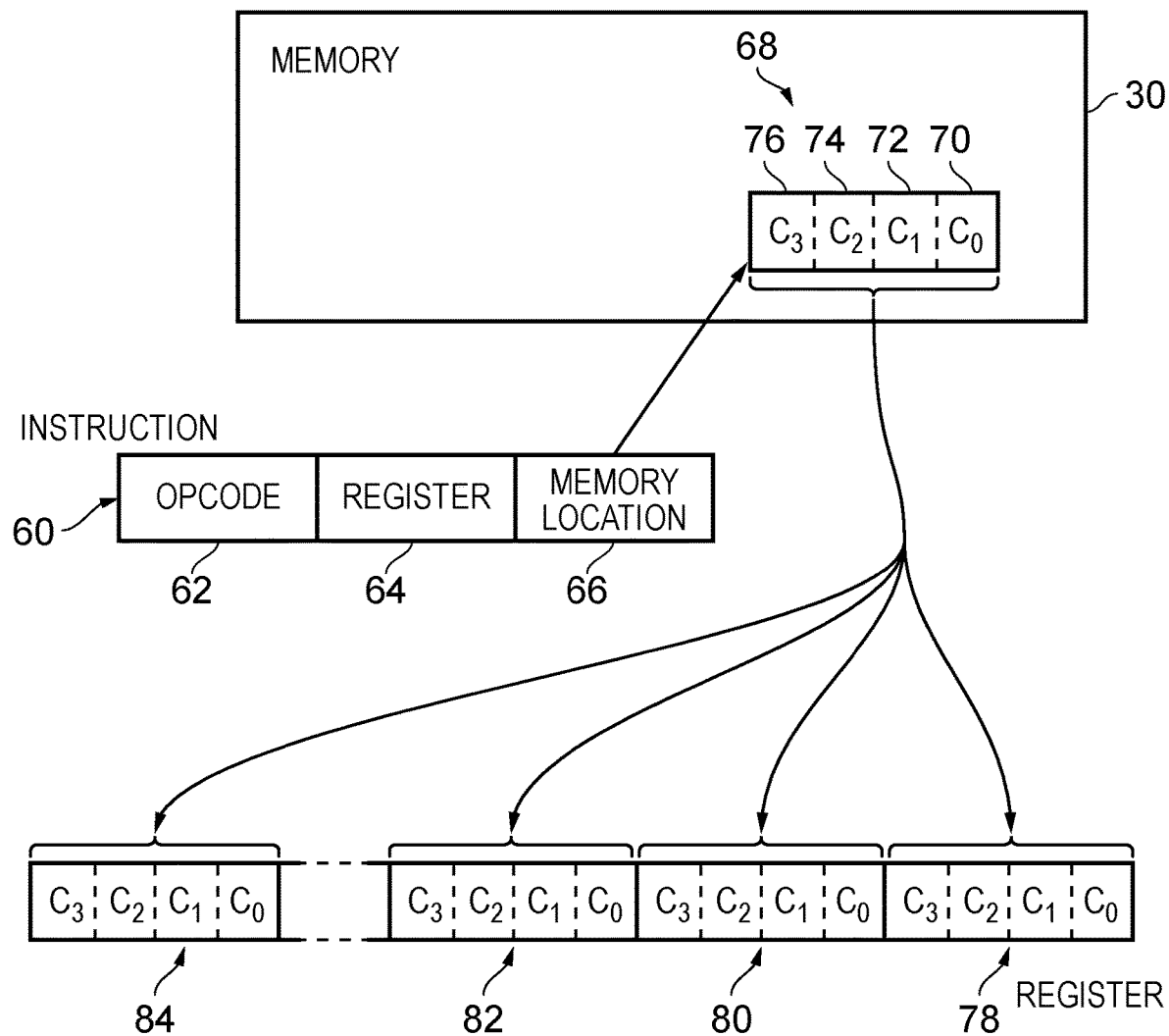

FIG. 3 schematically illustrates a variant on the embodiment of FIG. 2, demonstrating that such a data preparation instruction may cause different sizes of data groups to be copied and replicated. In the illustrated example of FIG. 3 the instruction 60 has the same structure, i.e. comprising an opcode 62, a register specifier 64, and a specified memory location 66. Execution of the instruction 60 causes the memory location 66 to be accessed and the data group 68 stored there (i.e. for example beginning at that memory location and extended over a predetermined number of data elements) comprises data elements c0, c1, c2, and c3 (labelled 70, 72, 74, and 76 in the figure). This data group 68 is copied and replicated across the width of the target register, and shown by the repeating copies of this data group 78, 80, 82, and 84. Note, referring back to FIG. 1, that the data group size can be predefined by a value held in a dedicated storage location 25 in the registers 20. Finally, it should be appreciated that the examples of FIGS. 2 and 3 are not limited to any particular data group widths or multiples of replication. However, to discuss just one example which is useful in a contemporary context, the replication could take place over a width of 128 bits. In the context of the Scalable Vector Extensions (SVE) provided by ARM® Limited of Cambridge, UK, this width corresponds to the SVE vector granule size. In the context of the ASMID instructions also provided by ARM® Limited, this corresponds to the size of an ASIMD register. Accordingly the present techniques enable to loading and replicating of the following groups types: two 64-bit data elements; four 32-bit data elements; eight 16-bit data elements; or sixteen 8-bit data elements.

Figure 4A:
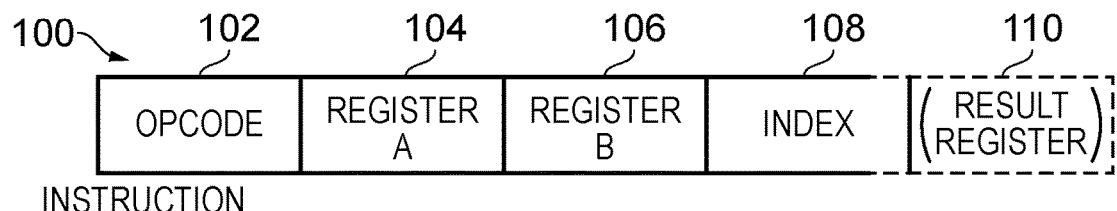
Figure 4B:
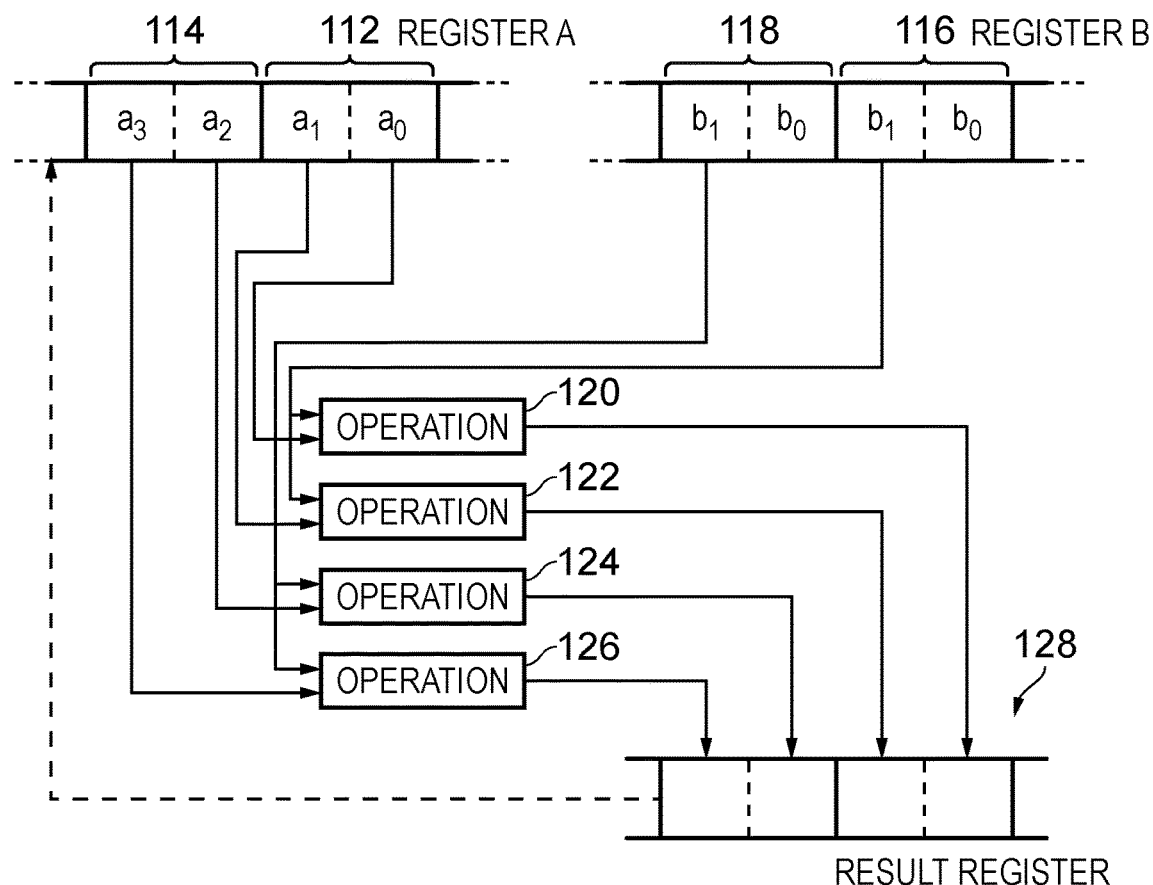

FIG. 4A schematically illustrates an example data processing instruction and FIG. 4B shows the implementation of the execution of that data processing instruction in one embodiment. This data processing instruction comprises an opcode 102, a first register specifier 104, a second register specifier 106, an index specifier 108, and as an optional variant, a result register specifier 110. FIG. 4B illustrates that the execution of this instruction causes data groups in register A and register B to be accessed, wherein all data elements in each data group in register A, i.e. in this example data elements a0 and a1 in the first data group 112 and data elements a2 and a3 in the second data group 114 to be accessed, whilst in register B only a selected data element is accessed in each of the data groups 116 and 118, namely the data element b1. Thus accessed these data elements are passed to the operational circuitry of the processing circuitry, represented in FIG. 4B by the operation units 120, 122, 124, and 126 which apply a data processing operation with respect to the data elements taken from register B and the data groups taken from register A. As mentioned above the instruction 100 may specify a result register (by means of the identifier 110) and the results of these operations are written to the respective data elements of a result register 128. In fact, in some embodiments the result register 128 and register A may be one and the same register, allowing for example multiply-accumulate operations to be performed with respect to the content of that register (as is schematically shown in FIG. 4 by means of the dashed arrow). Note also that the registers shown in FIG. 4B are intentionally illustrated as potentially extending (on both sides) beyond the portion accessed by the example instruction. This correspond to the fact that in some implementations (such as the above-mentioned Scalable Vector Extensions (SVE)) the vector size may be unspecified. For example taking FIG. 4B as depicting the operation of the instruction for a group of, say, two 64-bit data elements (b0 and b1) in an SVE example the vector size for the destination could be anything from 128 bits up to 2048 bits (in increments of 128 bits).

Figure 5A:
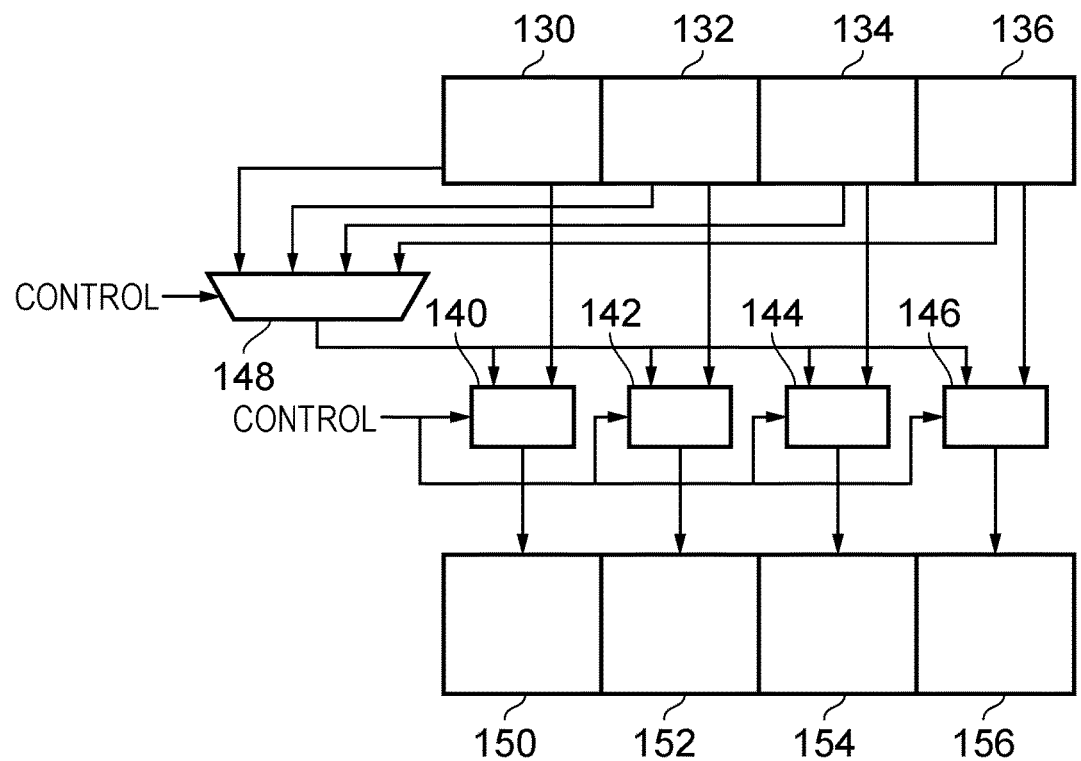
Figure 5B:
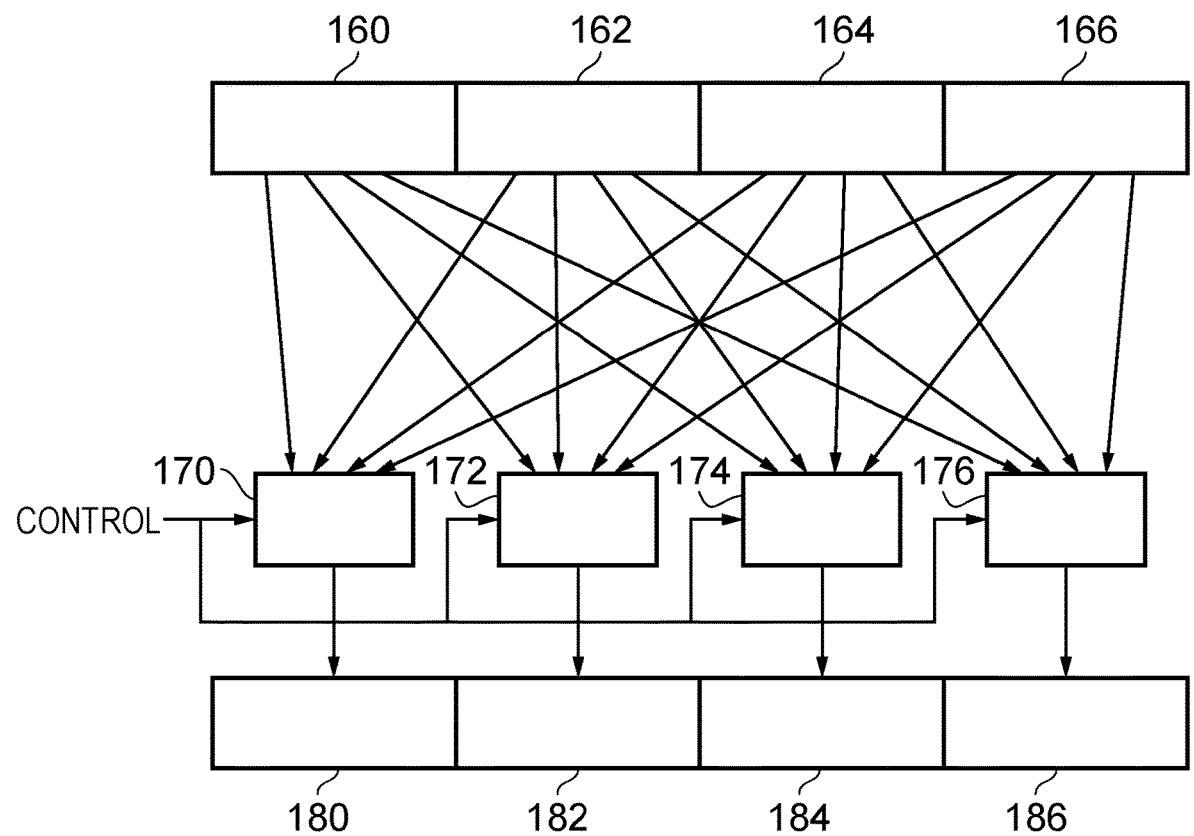

It should be appreciated that whilst the example shown in FIG. 4B gives a particular example of a selected (repeated) data element being used from the content of register B, generally it is clearly preferable a multi-purpose, flexible data processing apparatus to be provided with the ability for any data element in register B to be used as the input for any of the operation units 120-126. FIGS. 5A and 5B schematically illustrate two ways in which this may be achieved. FIG. 5A shows a set of storage components 130, 132, 134 and 136 which may for example store respective data elements in a register, connected to a set of operational units 140, 142, 144 and 146 (which may for example be fused multiply-add units). The connections between the storage units 130-136 and the functional units 140-146 are shown in FIG. 5A to be both direct and mediated via the multiplexer 148. Accordingly, this configuration provides that the content of any of the individual storage units 130-136 can be provided to any of the functional units 140-146, as a first input to each respective functional unit, and the content of storage units 130-136 can respectively be provided as the second input of the functional units 140-146. The result of the processing performed by the functional units 140-146 are transferred to the storage units 150-156, which may for example store respective data elements in a register. The multiplexer 148 and each of the functional units 140-146 are controlled by the control signals illustrated in order to allow the above mentioned flexible choice of inputs.

FIG. 5B schematically illustrates an alternative configuration to that of FIG. 5A in which each of the storage units 160, 162, 164, and 166 is directly connected to each of the functional units 170, 172, 174, and 176, each controlled by a respective control signal and the result of which is passed to the respective storage units 180, 182, 184, and 186. The approach taken by FIG. 5B avoids the need for, and delay associated with, using the multiplexer 148 of the FIG. 5B example, but at the price of the more complex wiring required. Both of the examples of FIG. 5A and FIG. 5B therefore illustrate the complexity that may arise when seeking to implement a fully flexible and configurable set of input storage units, operational units, and output storage units, in particular where the number of data elements concerned grows. For example, taking the example of FIG. 5A and doubling the number of input storage units, operational units, and output storage units to eight each would result in the need for an eightfold input multiplexer. On the other hand such an eight-wide implementation taking the approach of FIG. 5B would require eight paths from each input storage unit to each operation unit, i.e. 64 paths in total, as well as each operational unit needing to be capable of receiving eight different inputs and selecting between them. It will therefore be understood that the approach taken by embodiments of the present techniques which reuse data portions (e.g. data groups) across a register width enable limitations to be imposed on the multiplicity and complexity of the inputs to the required control units. Moreover though, it should be noted that in the above mentioned SVE/ASIMD context, the grouped element-by-vector instruction of FIG. 4A can be expected to be implementable as a single micro-operation, without the extra latency compared to the equivalent normal vector operation, because the selection and replication stays within a SVE vector granule and ASIMD already has the mechanisms to do this within 128 bits (e.g. using the "FMLA (by element)" instruction). As such the instruction shown in FIG. 4A can be expected to be more efficient than a sequence of a separate duplication (DUP) instructions followed by a normal vector operation.

Figure 6A:
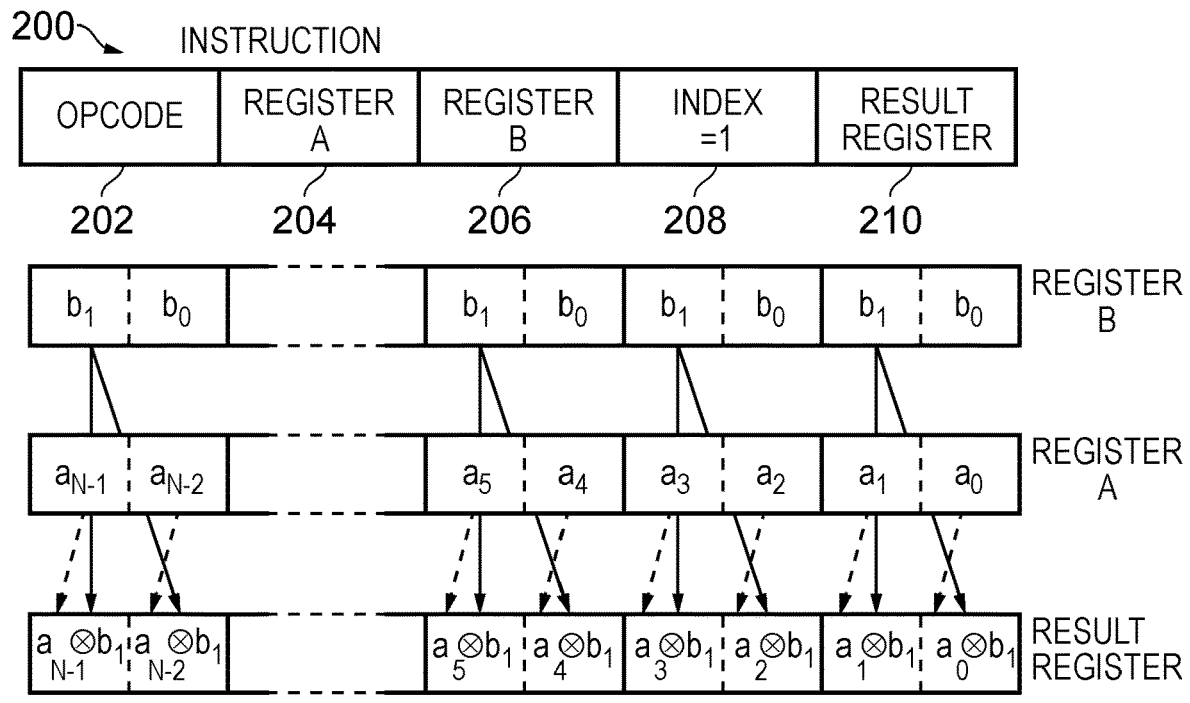
Figure 6B:
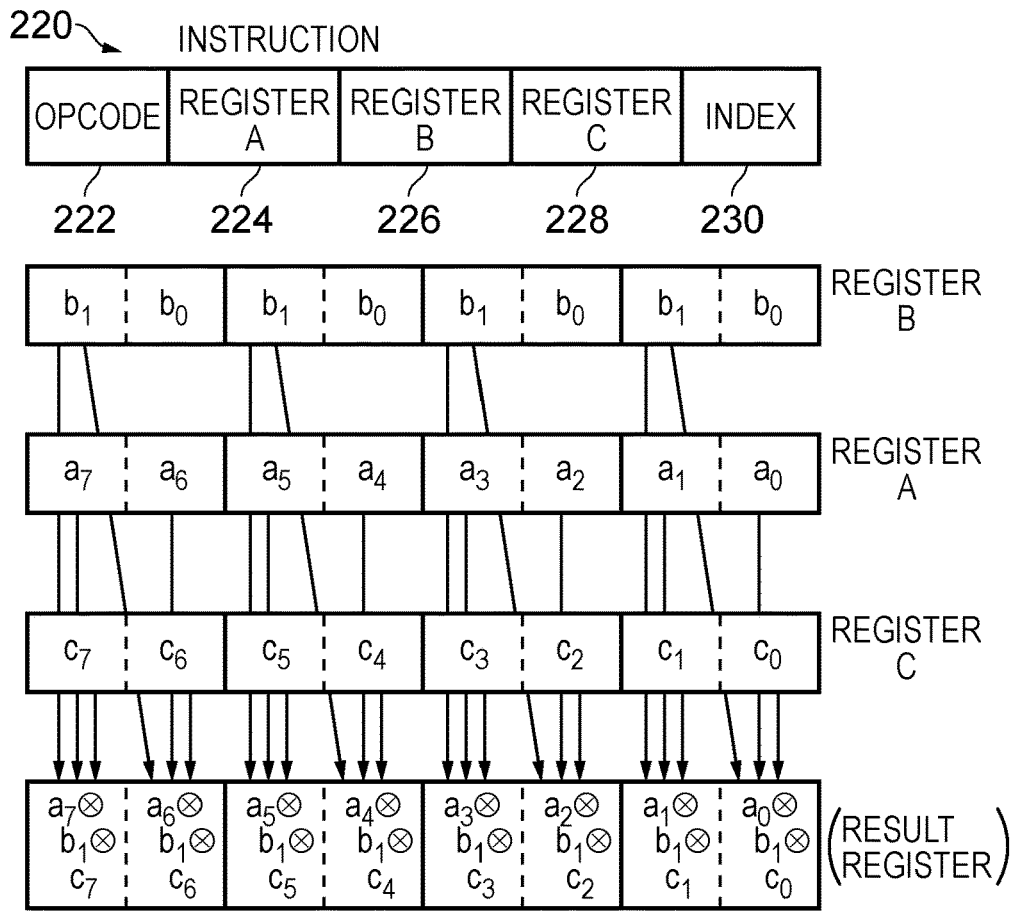

FIGS. 6A and 6B schematically illustrate two further examples of the data processing instruction for which an example was discussed with reference to FIGS. 4A and 4B. In the example of FIG. 6A the instruction 200 comprises an opcode 202, a first register specifier 204, a second register specifier 206, an immediate index value 208, and a result register specifier 210. The lower part of FIG. 6A schematically illustrates the execution of this instruction 200, wherein the specified data element (index 1) within a repeating sub-portion (data group) of register B is selected and this data element is multiplied by the vector represented by the respective data group of register A, to generate respective result data groups which populate the content of the result register. In FIG. 6A the operation performed between the respective data elements and data groups is shown by the generic operational symbol ⊗ indicating that although the example above is given of this being a multiplication, other operations are possible and contemplated.

The present techniques are not limited to such a data processing instruction only specifying one vector and FIG. 6B shows an example in which a data processing instruction 220 comprising an opcode 222, a first register specifier 224, a second register specifier 226, a third register specifier 228 and an index specifier 230 is provided. The lower part of FIG. 6B shows, in a similar way to that shown in FIG. 6A, how the selected data element (b1) in a first register (B) is combined with the data groups (vectors) taken from registers A and C and a result value is generated. Merely for the purposes of illustrating a variant, the result register in the example of FIG. 6B is not specified in the instruction 220, but rather a default (predetermined) result register is temporarily used for this purpose. Furthermore, whilst the combination of the components is shown in FIG. 6B again by means of the generic operator symbol ⊗, it should again be appreciated that this operation could take a variety of forms depending on the particular instruction being executed and whilst this may indeed be a multiply operation, it could also be any other type of arithmetic operation (addition, subtraction etc.) or could also be a logical operation (ADD, XOR, etc.).

Figure 7B:
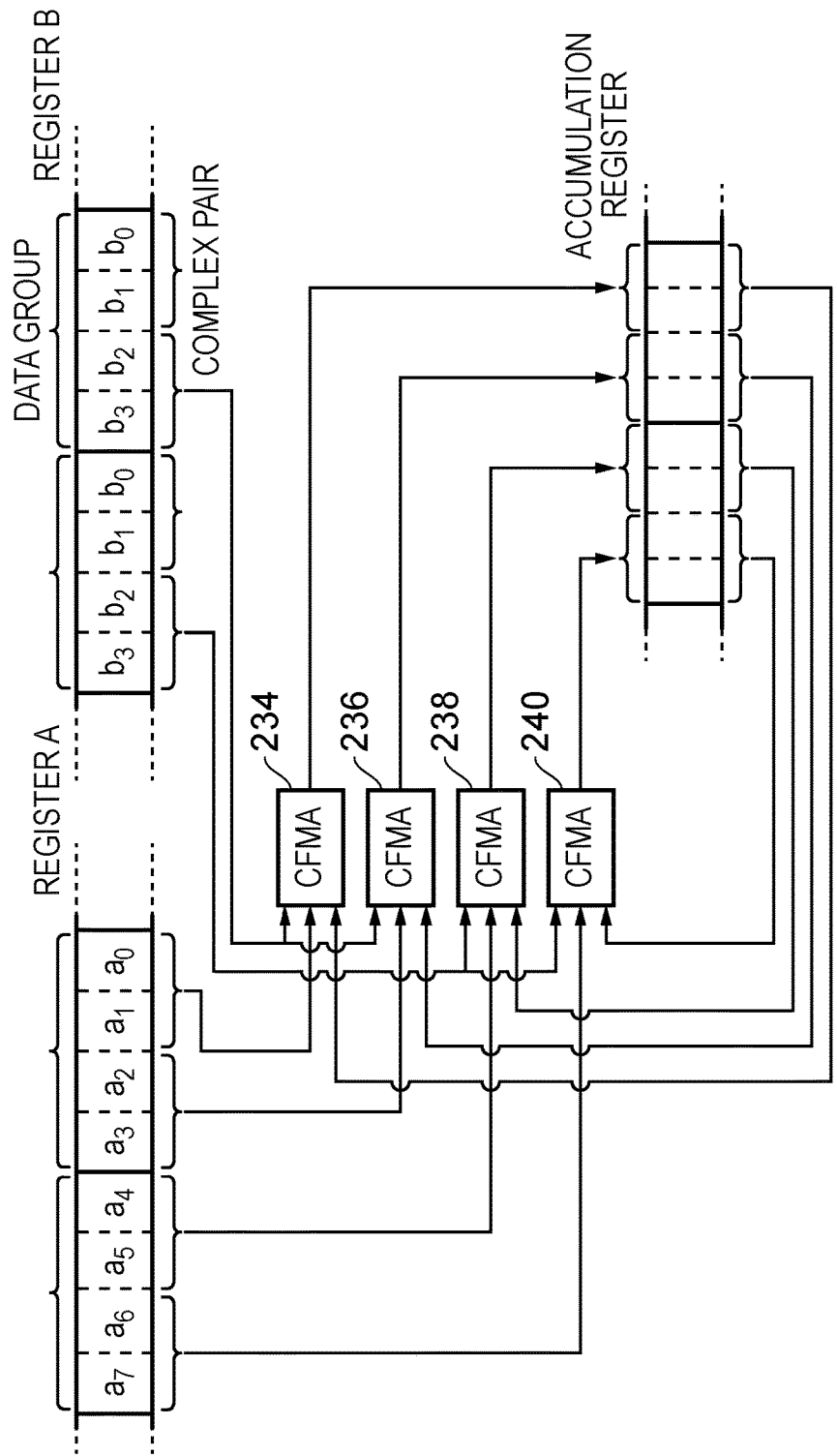
Figure 7A:
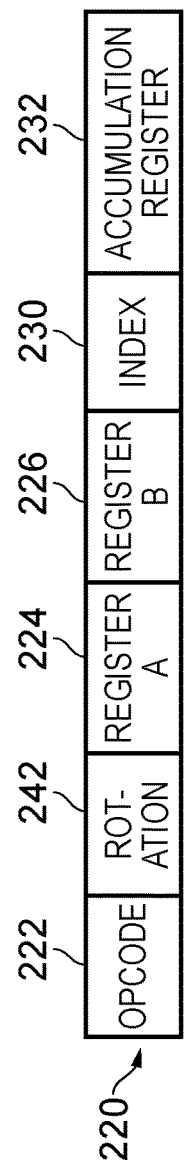

FIG. 7A schematically illustrates another example data processing instruction and FIG. 7B shows the implementation of the execution of that data processing instruction in one embodiment. This data processing instruction is provided to support element-by-vector operations for complex numbers and is referred to here as a FCMLA (fused complex multiply-accumulate) instruction. As shown in FIG. 7A the example FCMLA instruction 220 comprises an opcode 222, a rotation specifier 242, a first register (A) specifier 224, a second register (B) specifier 226, an index specifier 230, and an accumulation register specifier 232. FIG. 7B illustrates that the execution of this instruction causes data groups in register A and register B to be accessed, wherein the data group in this instruction defines a number of complex elements. A complex element is represented by a pair of elements (see label "complex pair" in FIG. 7B). In the example of FIG. 7B, the complex pairs of register B are (b3,b2) and (b1,b0), and complex pair (b3,b2) is selected. The complex pairs of register A are (a7,a6), (a5,a4), (a3,a2), and (a1,a0). The complex pairs selected from register A and B (all complex pairs from register A and a selected complex pair from the data groups of register B identified by the index 230) are passed to the complex fused multiply-accumulate (CFMA) units 234, 236, 238, 240, where each complex pair from register A forms one input to each of the CFMA units respectively, whilst the selected complex pair from one data group in register B forms another input to CFMA units 234 and 236 and the other selected complex pair from the next data group in register B forms another input to CFMA units 238 and 240. The respective results of the complex fused multiply-accumulation operations are accumulated as respective complex pairs in the specified accumulation register, which in turn each form the third input to each of the respective CFMA units. The rotation parameter 242 (which is optionally specified in the instruction) is a 2-bit control value that changes the operation as follows (just showing the first pair, where (c1,c0) is the accumulator value before the operation):

| Rotation | Resulting complex pair (c1, c0) |
|---|---|
| 00 | (c1 + a1 * b3, c0 + a1 * b2) |
| 01 | (c1 − a1 * b3, c0 + a1 * b2) |
| 10 | (c1 − a0 * b2, c0 − a0 * b3) |
| 11 | (c1 + a0 * b2, c0 − a0 * b3) |

Figure 8:
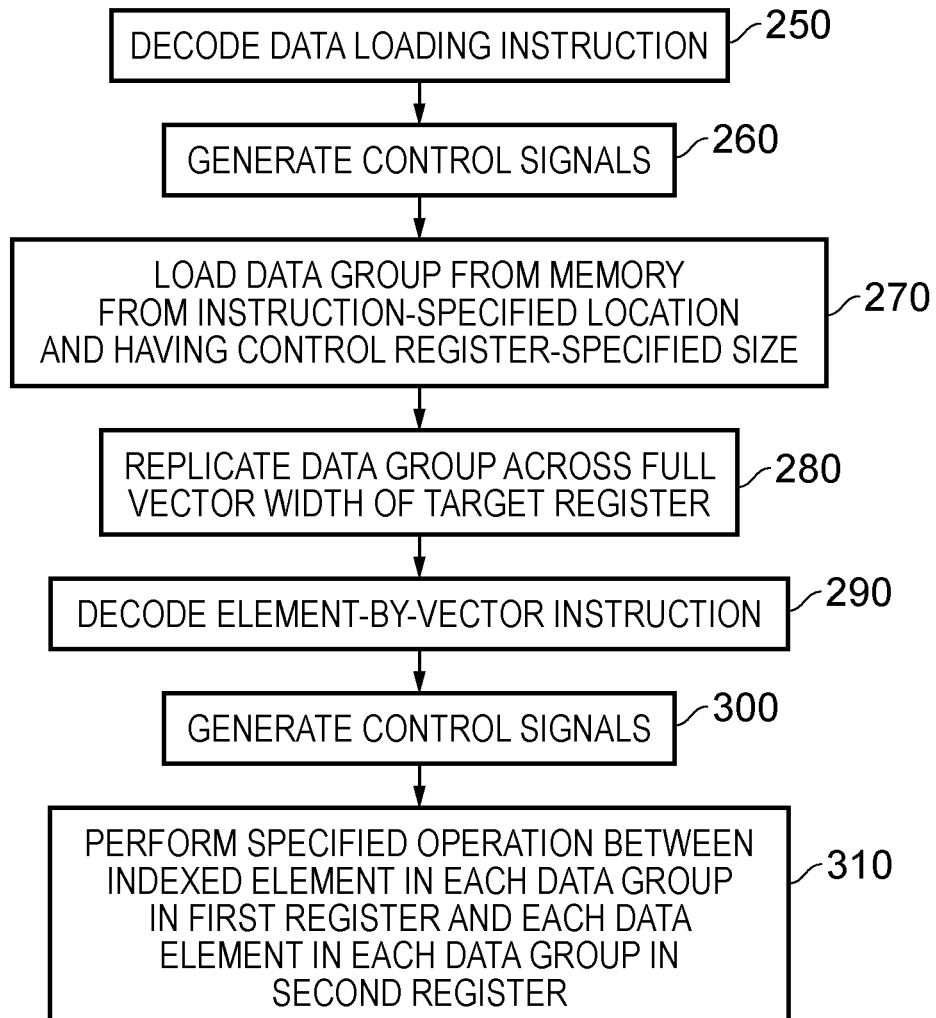

FIG. 8 shows a sequence of steps which are taken according to the method of one embodiment. The flow begins at step 250 where a data loading (preparation) instruction is decoded and at step 260 the corresponding control signals are generated. These control signals then cause, at step 270, a specified data group to be loaded from memory from an instruction specified location (see for example FIGS. 2 and 3 for examples of this) and having a control register specified size. The control signals then further cause the loaded data group to be replicated across the vector width at step 280 of a specified target register (specified in the data loading (preparation) instruction). Execution of the data loading instruction is then complete. The flow proceeds to step 290 where an element-by-vector data processing instruction is decoded. Corresponding control signals are then generated at step 300 and subsequently at step 310 the operation specified by the element-by-vector instruction is then performed between an indexed element in each data group in the first register specified in the instruction and each data element in each data group of a second register specified in the instruction.

Figure 9A:
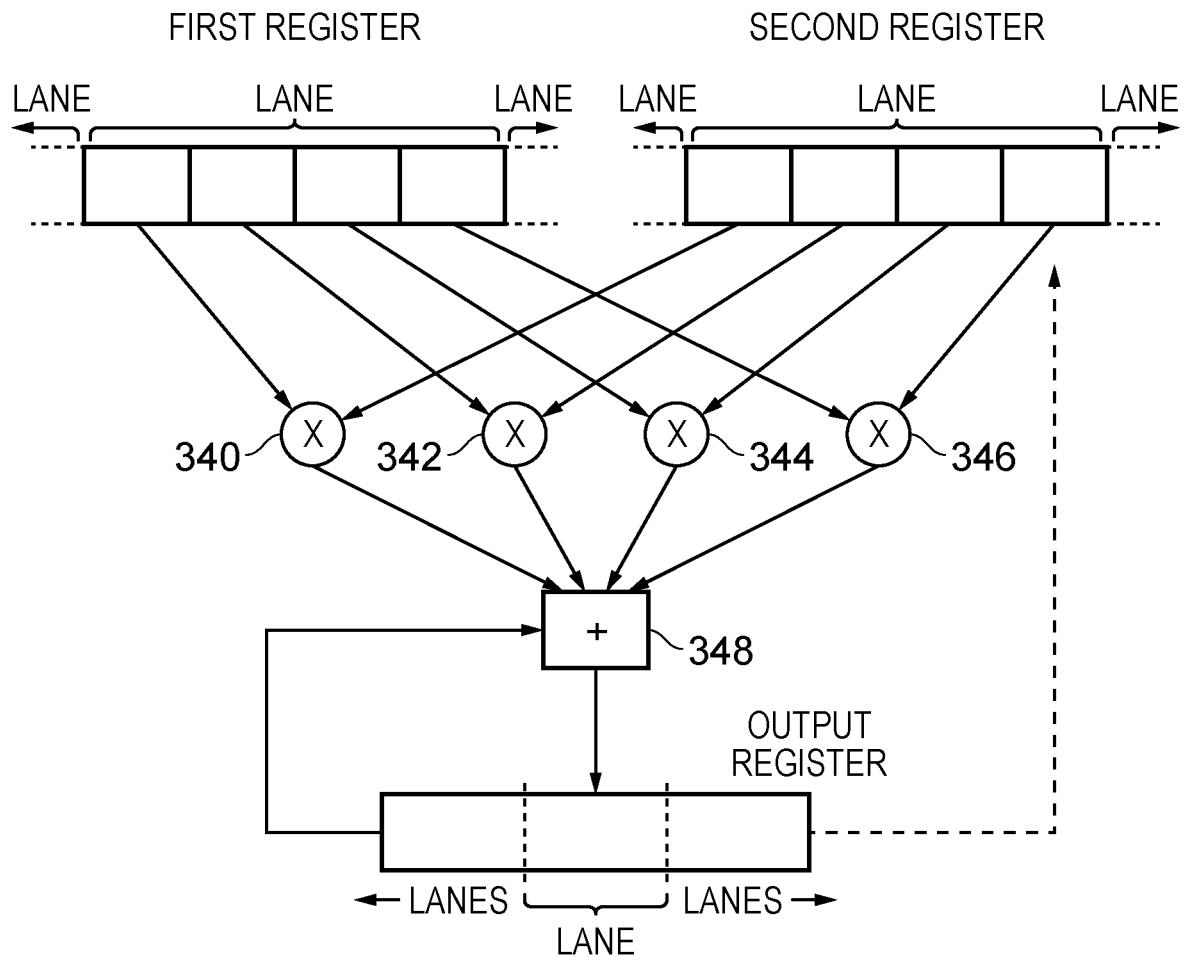
Figure 9B:
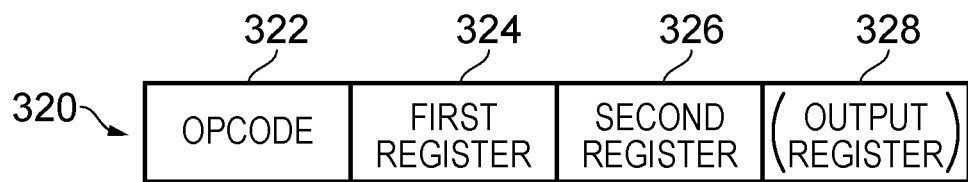
Figure 9B:
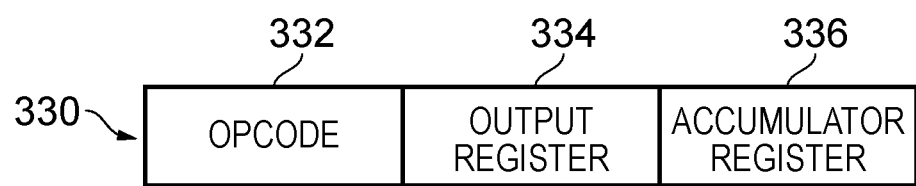

FIG. 9A schematically illustrates the execution of a different data processing instruction according to the present techniques. FIG. 9B shows two examples of such an instruction, the first 320 comprising an opcode 322, a first register specifier 324, a second register specifier 326, and (optionally) an output register specifier 328. The second example data processing instruction 330 shown in FIG. 9B comprises an opcode 332, an output register specifier 334, and an accumulator register specifier 336. These are explained with reference to FIG. 9A. The first and second source registers specified by the data processing instruction are shown at the top of FIG. 9A, each sub-divided into data element portions grouped into lanes. In response to the data processing instruction the data processing apparatus (i.e. the processing circuitry under control of the control signals generated by the decoder circuitry) retrieves a set of data elements from each of the first source register and the second source register. In the example shown in FIG. 9A a set of four data elements are retrieved from each lane of the first and second source registers. These are brought together pair-wise at the operational units 340, 342, 344, and 346, which are arranged to perform multiply operations. The result of these multiply operations are brought together at the summation unit 348 and finally the result value thus generated is written into a corresponding lane of an output register. In other words, a "dot product" operation is carried out. The labelling of the lanes in FIG. 9A illustrates the fact that the four multiply units 340-346 and the summation unit 348 represent only one set of such units provided in the data processing apparatus' processing circuitry and these are correspondingly repeated to match each of the lanes which the data processing apparatus can handle for each register. The number of lanes in each register is intentionally not definitively illustrated in FIG. 9A corresponding to the fact that the number of lanes may be freely defined depending on the relative width of the data elements, the number of data elements in each lane, and the available register width. It can be seen therefore that the instruction behaves similarly to a same-width operation at the accumulator width (e.g. in an example of 8-bit values (say, integers) in 32-bit wide lanes, it behaves similarly to a 32 bit integer operation). However, within each lane, instead of a 32×32 multiply being performed, the 32-bit source lanes are considered to be made up of four distinct 8-bit values, and a dot product operation is performed across these two "mini-vectors". The result is then accumulated into the corresponding 32-bit lane from the accumulator value. It will be appreciated that the figure only explicitly depicts the operation within a single 32-bit lane. Taking one example of a 128-bit vector length, the instruction would effectively perform 32 operations (16 multiplies and 16 adds), which is 3-4× denser than comparable contemporary instructions. If implemented into an architecture which allows longer vectors, such as the Scalable Vector Extensions (SVE) provided by ARM® Limited of Cambridge, UK, these longer vectors would increase the effective operation count accordingly. Further should be appreciated that whilst a specific example of a 32-bit lane width is shown, many different width combinations (both in input and output) are possible, e.g. 16-bit×16-bit→64-bit or 16-bit×16-bit→32-bit. "By element" forms (where, say, a single 32-bit lane is replicated for one of the operands) are also proposed. The dashed arrow joining the output register to the second register in FIG. 9A schematically represents the fact that the second register may in fact be the output register, allowing for an accumulation operation with respect to the content of this register to be performed. Returning to consideration of FIG. 9B, note that two distinct instructions are illustrated here. Generally, the first illustrated instruction may cause all of the operations illustrated in FIG. 9A to be carried out, but embodiments are also provided in which the first illustrated instruction in FIG. 9B only causes the multiply and summation operation to be carried out and the subsequent accumulation operation taking the result in the output register and applying it to the accumulator register may be carried out by the second illustrated instruction specifically purposed to that task.

Figure 10:
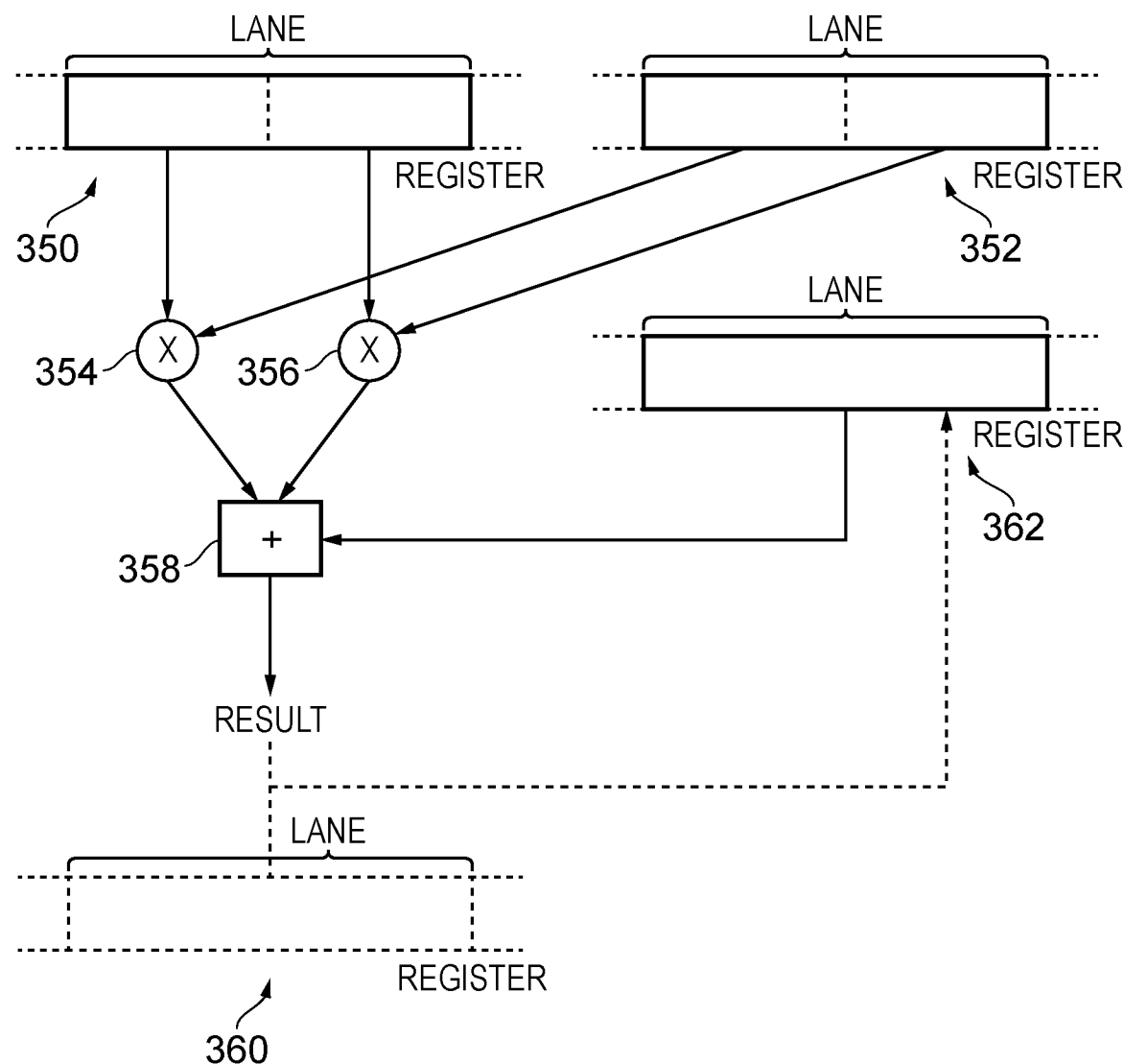

FIG. 10 schematically illustrates some variations in embodiments of the execution of the data processing instructions shown in FIG. 9B. Here, for clarity of illustration only, the number of data elements accessed in each of two source registers 350 and 352 are reduced to two. Correspondingly only two multiply units 354 and 356 are provided (for each lane) and one summation unit 358 (for each lane). Depending on the particular data processing instruction executed, the result of the "dot product" operation may be written to a specified output register 360 (if specified) or may alternatively be written to an accumulation register 362 (if so specified). In the latter case, where an accumulation register is defined, the content of this accumulation register may be taken as an additional input to the summation unit 358, such that the ongoing accumulation can be carried out.

Figure 11:
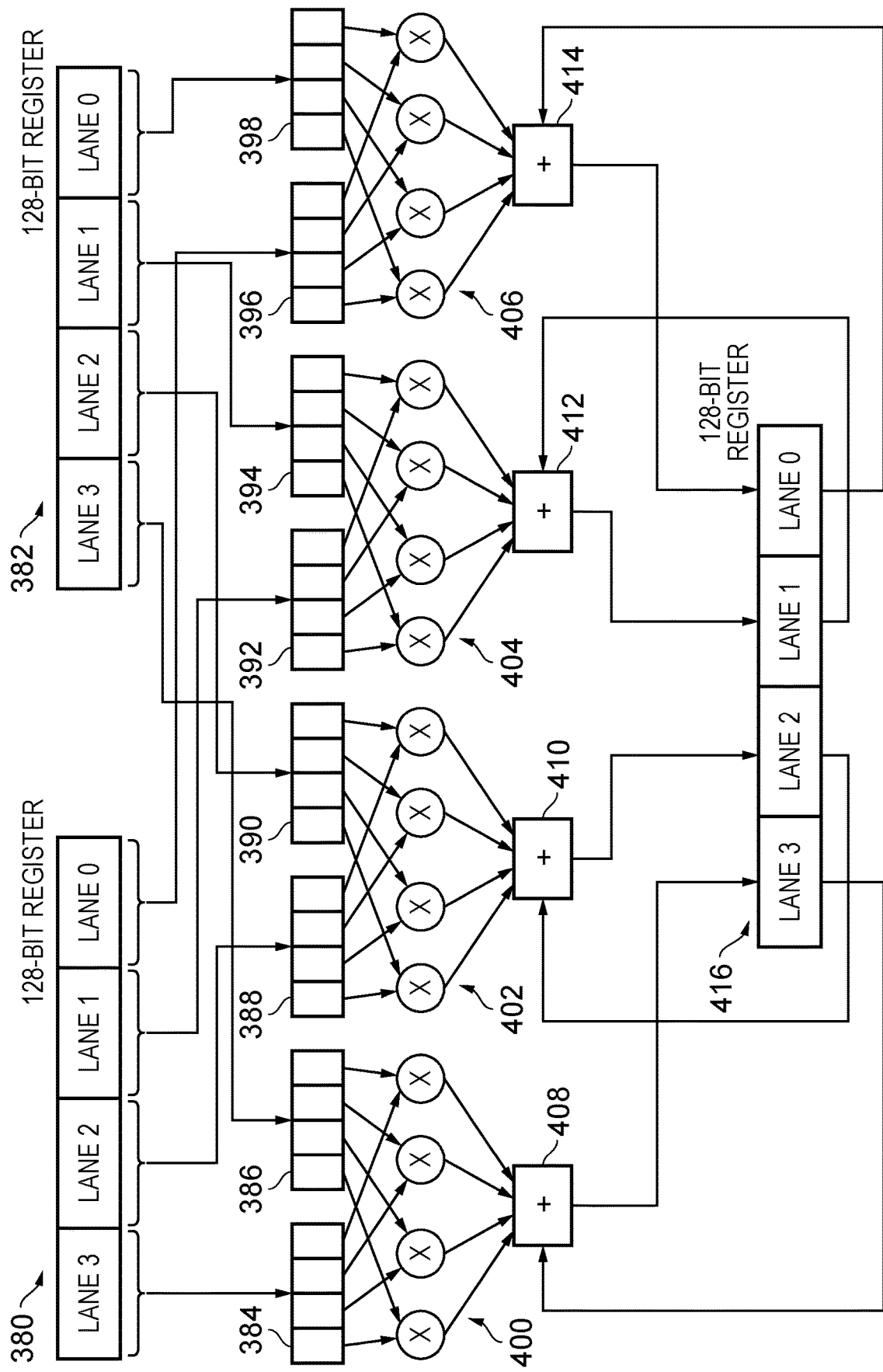
Figure 12:
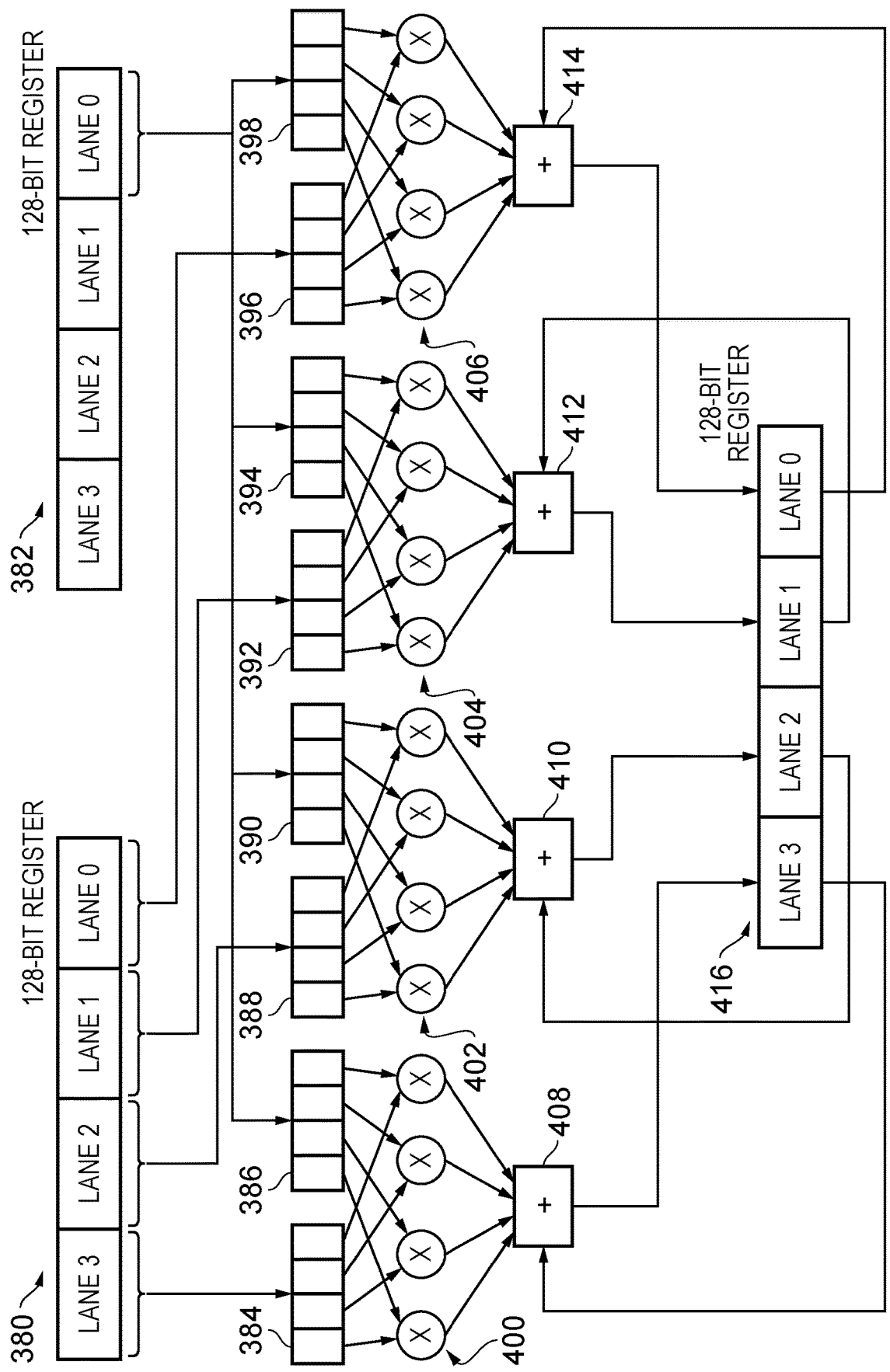
FIG. 12 shows a variant on the embodiment of FIG. 11.

FIG. 11 schematically illustrates a more complex example in which two 128-bit registers 380 and 382 are the source registers for one of the above mentioned "dot product" data processing operation instructions. Each of these source registers 380 and 382 is treated in terms of four independent lanes (lanes 0-3) and the respective content of these lanes is taken into temporary storage buffers 384-398 such that respective content of the same lane from the two source registers are brought into adjacent storage buffers. Within each storage buffer the content data elements (four data elements in each in this example) then provide the respective inputs to a set of four multiply units provided for each lane 400, 402, 404, and 406. The output of these then feed into respective summation units 408, 410, 412, and 414 and the output of each of these summation units is passed into the respective corresponding lane of an accumulation register 416. The respective lanes of the accumulation register 416 provide the second type of input into the summation units (accumulators) 408-414. FIG. 12 shows the same basic configuration to that of FIG. 11 and indeed the same subcomponents are represented with the same reference numerals and are not described again here. The difference between FIG. 12 and FIG. 11 is that whilst the content of each of the four lanes of the 128-bit register 380 (source register) is used only a first lane content from the second 128-bit source register 382 is used and this content is duplicated to each of the temporary storage units 386, 390, 394, and 398. This lane, selected as the (only) lane which provides content from the source register 382 in this example, is specified by the instruction. It will be appreciated that there is no significance associated with this particular lane (lane 0), which has been chosen for this example illustration and any of the other lanes of source register 382 could equally well be specified. The specification of the selected lane is performed by the setting of an index value in the instruction, as for example is shown in the example instruction of FIG. 4A.

Figure 13:
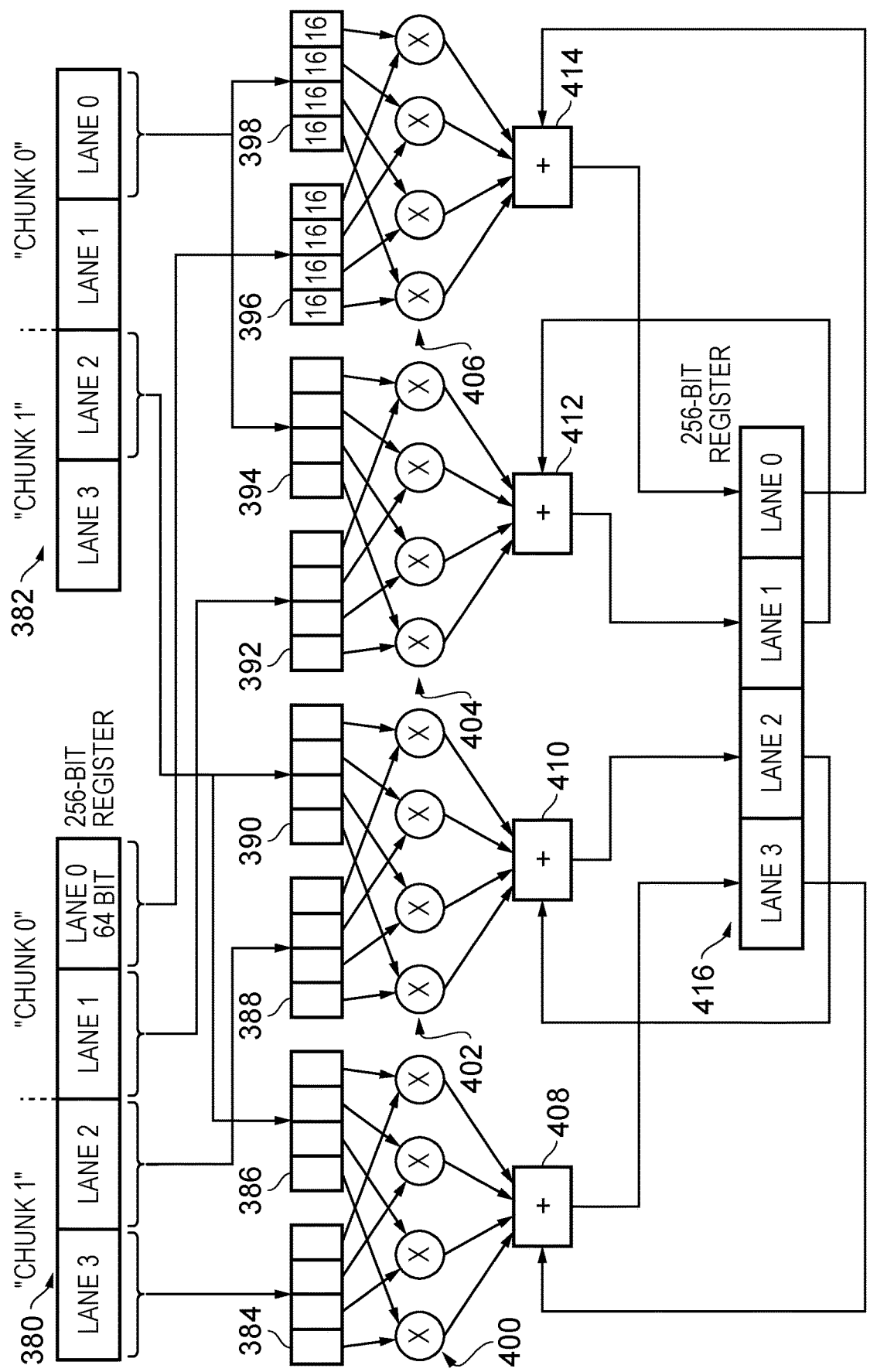
FIG. 13 shows a further variant on the examples shown in FIGS. 11 and 12.

A further variant on the examples shown in FIGS. 11 and 12 is shown in FIG. 13. Again the same subcomponents are reused here, given the same reference numerals, and are not described again for brevity. The difference shown in FIG. 13 with respect to the examples of FIGS. 11 and 12 is that the four lanes of each of the source registers 380 and 382 are themselves treated in two data groups (also referred to as "chunks" herein, and labelled chunk 0 and chunk 1 in the figure). This does not affect the manner in which the content of the register 380 is handled, the content of its four lanes being transferred to the temporary storage units 384, 388, 392 and 396 as before. However, the extraction and duplication of a single lane content as introduced with the example of FIG. 12 is here performed on a data group by data group basis ("chunk-by-chunk" basis), such that the content of lane 0 of register 382 is replicated and transferred to the temporary storage buffers 394 and 398, whilst the content of lane 2 in chunk 1 is duplicated and transferred into the temporary storage buffers 386 and 390. It is to be noted that the operation shown in FIG. 13 can be considered to be a specific example of the more generically illustrated FIG. 4B, where the "operation" in that figure carried out by the four processing units 120-126 here comprises the dot product operation described. Again, it will be appreciated that there is no significance associated with the particular lanes selected in this illustrated example (lanes 2 and 0, as the "first" lanes of each chunk), these having been specified by the setting of an index value in the instruction, as for example is shown in the example instruction of FIG. 4A. Finally note that the execution of the data processing instruction illustrated in FIG. 13 may usefully be preceded by the execution of a data preparation instruction, such as those shown in FIGS. 2 and 3 and discussed above, in order suitably to prepare the content of the source registers.

Figure 14:
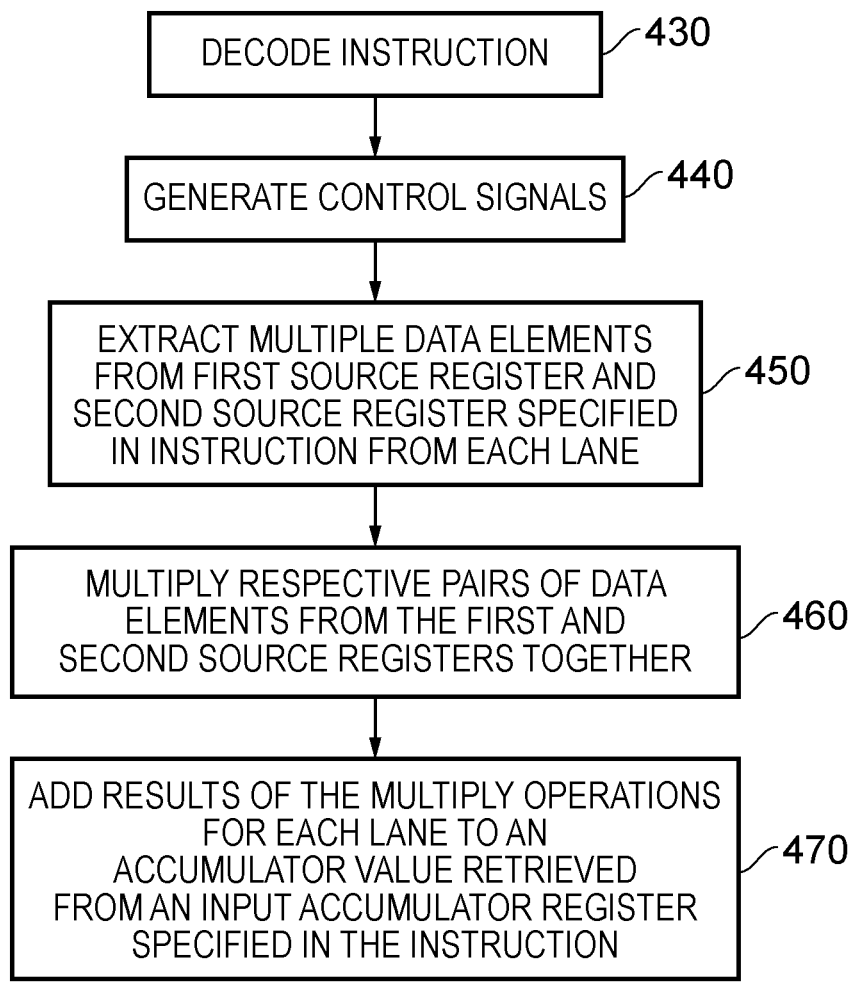
FIG. 14 shows a sequence of steps which are taken according to the method of one embodiment.

FIG. 14 shows a sequence of steps which are taken according to the method of one embodiment when executing a data processing instruction to perform a dot product operation such as those discussed above with reference to FIGS. 9A-13. The flow begins at step 430 where the instruction is decoded and at step 440 the corresponding control signals are generated. Then at step 450 multiple data elements are extracted from the first source register and the second source register specified in the instruction on a lane-by-lane basis and at step 460 respective pairs of data elements from the first and second source registers are multiplied together in each lane in order to perform the first part of the dot product operation. Then, at step 470 the results of the respective multiplier operations are added together, again on a lane-by-lane basis, and are added (in this example) to an accumulator value which has been retrieved from a input accumulator register also specified in the instruction.

FIG. 15A schematically illustrates the execution of a data processing instruction provided by some embodiments. FIG. 15B shows a corresponding example instruction. This example instruction 500 comprises an opcode 502, a first source register specifier 504, a second source register specifier 506, and a set of accumulation registers specifier 508. Implemented in the example of FIG. 15A the first and second source registers 510 and 512 are shown at the top of the figure from which in response to execution of the data processing instruction, data elements are extracted. All (four) data elements are extracted from the first source register 510 individually, whilst the four data elements which make up the full content of the second source register 512 are extracted as a block. The content of the second source register 512 is passed to each of four operational units, namely the fused multiply-add (FMA) units 514, 516, 518, and 520. Each of the four data elements extracted from the first source register 510 are passed to a respective one of the FMA units 514-520. Each of the FMA units 514 and 520 is controlled by respective control signals, as illustrated. Accordingly, the execution of the data processing instruction in the example of FIG. 15A causes the data processing circuitry (represented by the four FMA units) to perform four vector-by-element multiply/accumulate operations simultaneously. It should be noted that the present techniques are not limited to a multiplicity of four, but this has been found to be a good match for the load:compute ratios that are typically available in such contemporary processing apparatuses. The output of the FMA units is applied to a respective register of the set of accumulation registers specified in the instruction (see item 508 in FIG. 15B). Moreover, the content of these four accumulation registers 522, 524, 526, and 528 form another input to each of the FMA units 514-520, such that an accumulation is carried out on the content of each of these registers.

FIG. 16 shows an example visualisation of the example of FIG. 15A, representing a simple matrix multiply example, where a subject matrix A and subject matrix B are to be multiplied by one another to generate a result matrix C. In preparation for this a column (shaded) of matrix A has been loaded into register v0 and a row (shaded) of matrix B has been loaded into register v2. The accumulators for the result matrix C are stored in the registers v4-v7. Note that although the values loaded from matrix A are depicted as a column, the matrices are readily transposed and/or interleaved such that the contiguous vector loads from each source array can be performed. It is to be noted in this context that matrix multiplication is an $O(n^3)$ operation and therefore auxiliary tasks to prepare the matrix data for processing would be an $O(n^2)$ operation and thus a negligible burden for sufficiently large n. An instruction corresponding to the example shown could be represented as FMA4 v4-v7, v2, v0[0-3]. Here the FMA4 represents the label (or equivalently the opcode) of this instruction, whilst v4-v7 are the set of accumulation registers, v2 is the source register from which the full content is taken, whilst v0 is the source register from which a set of data elements (indexed 0-3) are taken. Execution of this instruction then results in the four operations:

$$v4+=v2*v0[0],$$

$$v5+=v2*v0[1],$$

$$v6+=v2*v0[2], \text{ and}$$

$$v7+=v2*v0[3].$$

FIG. 17 represents a simpler version of the examples shown in FIG. 15A, where in this example only two data elements are derived from each of the first and second source registers 540 and 542. Both data elements extracted from register 542 are passed to each of the FMA units 544 and 546, whilst a first data element from register 540 is passed to the FMA unit 544 and a second data element is passed to the FMA unit 546. The content of the accumulation registers 548 and 550 provide a further input to each of the respective FMA units and the accumulation result is applied to each respective accumulation register. Conversely FIG. 18 illustrates an example where more data elements are extracted from each of the source registers with these (eight in this example) being extracted from each of the source registers 560 and 562. The full content of register 562 provided to each of the FMA units 564-578, whilst a selected respective data element from register 560 is provided as the other input. The result of the multiply-add operations are accumulated in the respective accumulation registers 580-594.

FIG. 19 shows an example giving more detail of some specific multiplication operations which are performed in one example. Here the two source registers v0 and v2 are each treated in two distinct data groups. The two data groups of register v0 also represent portions of the register across which a selected data element is replicated, in the example of FIG. 19 this being the "first" data element of each portion, i.e. elements [0] and [4] respectively. The selected data element can be specified in the instruction by means of an index. Thus, in a first step in the data operation shown in FIG. 19 the data element of these two data groups of the register v0 are replicated across the width of each portion as shown. Thereafter these provide the inputs to four multipliers 600, 602, 604, and 606, whilst the other input is provided by the content of the register v2. Then the multiplication of the respective data elements of v2 with the respective data elements of v0 is performed and the results are applied to the target registers v4-v7, wherein the sub-division into two data groups is maintained into these four accumulation registers as shown by the specific calculations labelled for each data group of each accumulation register. Note that the execution of the data processing instruction illustrated in FIG. 19 may usefully be preceded by the execution of a data preparation instruction, such as those shown in FIGS. 2 and 3 and discussed above, in order suitably to prepare the content of the source registers.

FIG. 20 shows an example where the content of two source registers 620 and 622 are treated as containing data elements in two independent lanes (lane 0 and lane 1). Within each lane two sub-portions are defined and this "laning" of the content is maintained throughout the calculation i.e. through the FMA units 624, 626, 628, and 630, and finally into the accumulation registers 632 and 634.

FIG. 21 shows a sequence of steps which are taken according to the method of one embodiment when processing a data processing instruction such as that described with respect to the examples of FIG. 15A to FIG. 20. The flow begins at step 650 where the data processing instruction is decoded and at step 652 the corresponding control signals are generated. Then at step 654 N data elements are extracted from the first source register specified in the data processing instruction, whilst at step 656 the N data elements are multiplied by content of the second source register specified in the data processing instruction. At step 658 the N result values of these multiply operations are then applied to the content of N respective accumulation registers specified in the data processing instruction. It will be appreciated in the light of the preceding description that the execution of the instruction as described with respect to FIG. 21, and equally the execution of the instruction as described with respect to FIG. 14, may usefully be preceded by the execution of a data preparation instruction, such as those shown in FIGS. 2 and 3 and discussed above, in order suitably to prepare the content of the source registers.

FIG. 22 illustrates a virtual machine implementation that may be used. Whilst the above described embodiments generally implement the present techniques in terms of apparatus and methods for operating specific processing hardware supporting the techniques concerned, it is also possible to provide so-called virtual machine implementations of hardware devices. These virtual machine implementations run on a host processor 730 typically running a host operating system 720 supporting a virtual machine program 710. This may require a more powerful processor to be provides in order to support a virtual machine implementation which executes at a reasonable speed, but such an approach may be justified in certain circumstances, such as when there is a desire to run code native to another processor for compatibility or re-use reasons. The virtual machine program 710 provides an application program interface to an application program 700 which is the same as the application program interface which would be provided by the real hardware which is the device being modelled by the virtual machine program 710. Thus, program instructions including one or more examples of the above-discussed processor state check instruction may be executed from within the application program 700 using the virtual machine program 710 to model their interaction with the virtual machine hardware.

In brief overall summary a data processing apparatus, a method of operating a data processing apparatus, a non-transitory computer readable storage medium, and an instruction are provided. The instruction specifies a first source register, a second source register, and an index. In response to the instruction control signals are generated, causing processing circuitry to perform a data processing operation with respect to each data group in the first source register and the second source register to generate respective result data groups forming a result of the data processing operation. Each of the first source register and the second source register has a size which is an integer multiple at least twice a predefined size of the data group, and each data group comprises a plurality of data elements. The operands of the data processing operation for each data group are a selected data element identified in the data group of the first source register by the index and each data element in the data group of the second source register. A technique for element-by-vector operation which is readily scalable as the register width grows.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing apparatus comprising:
register storage circuitry having a plurality of registers;
decoder circuitry responsive to a data processing instruction to generate control signals, the data processing instruction specifying in the plurality of registers: a first source register, a second source register, and an index,
wherein each of the first source register and the second source register has a size which is an integer multiple at least twice a predefined size of a data group, and each data group comprises a plurality of data elements; and
processing circuitry responsive to the control signals to perform a data processing operation with respect to each said data group in the first source register and the second source register to generate respective result data groups forming a result of the data processing operation,
wherein operands of the data processing operation for each said data group are a selected data element identified in the data group of the first source register by the index and each data element in the data group of the second source register, and
wherein each said data group of the first source register comprise an identical plurality of data elements.

2. The data processing apparatus as claimed in claim 1, wherein the processing circuitry comprises data element manipulation circuitry responsive to the control signals to supply multiple instances of the selected data element to multiple data operation circuits, wherein each data operation circuit is responsive to the control signals to perform the data processing operation with respect to a respective data group in the first source register and the second source register.

3. The data processing apparatus as claimed in claim 1, wherein the decoder circuitry is responsive to a data preparation instruction to generate further control signals, the data preparation instruction specifying a memory location and a target register,
and wherein the processing circuitry is responsive to the further control signals to retrieve a subject data group item having the predefined size from the memory location and to fill the target register by replication of the subject data group item.

4. The data processing apparatus as claimed in claim 3, wherein the target register is the first source register.

5. The data processing apparatus as claimed in claim 1, wherein the register storage circuitry comprises a control register to store an indication of the integer multiple.

6. The data processing apparatus as claimed in claim 5, wherein the decoder circuitry is responsive to a control instruction to amend the indication of the integer multiple up to a predefined maximum value for the data processing apparatus.

7. The data processing apparatus as claimed in claim 1, wherein the data processing instruction further specifies a result register in the plurality of registers,
and the processing circuitry is further responsive to the control signals to apply the result of the data processing operation to the result register.

8. The data processing apparatus as claimed in claim 7, wherein the processing circuitry is responsive to the control signals to store the result of the data processing operation in the result register.

9. The data processing apparatus as claimed in claim 1, wherein the processing circuitry is responsive to the control signals to apply the result of the data processing operation to the second source register.

10. The data processing apparatus as claimed in claim 1, wherein the data processing instruction further specifies at least one further source register in the plurality of registers,
wherein the processing circuitry is responsive to the control signals to perform the data processing operation with further respect to each said data group in the at least one further source register to generate the respective result data groups forming the result of the data processing operation, and
wherein operands of the data processing operation for each said data group further comprise each data element in the data group of the at least one further source register.

11. The data processing apparatus as claimed in claim 10, wherein the processing circuitry is responsive to the control signals to accumulate the result of the data processing operation with previous content in the at least one further source register.

12. The data processing apparatus as claimed in claim 1, wherein the data processing operation is an arithmetic operation.

13. The data processing apparatus as claimed in claim 12, wherein the data processing operation is a multiply operation.

14. The data processing apparatus as claimed in claim 8, wherein the data processing operation is an arithmetic operation and the data processing operation is a dot product operation comprising:
extracting at least a first data element and a second data element from each of the first source register and the second source register;
performing multiply operations of multiplying together at least first data element pairs and second data element pairs; and
summing results of the multiply operations.

15. The data processing apparatus as claimed in claim 14, wherein the multiply operations comprise multiplying together first data element pairs, second data element pairs, third data element pairs and fourth data element pairs.

16. The data processing apparatus as claimed in claim 14, wherein the data processing instruction further specifies an accumulation register in the plurality of registers and the data processing operation is a dot product and accumulate operation which further comprises:
loading an accumulator value from the accumulator register;
summing the results of the multiply operations with the accumulator value; and storing a result of the summing to the accumulator register.

17. The data processing apparatus as claimed in claim 8, wherein the data processing operation is an arithmetic operation and the data processing operation is a multiply-accumulate operation.

18. The data processing apparatus as claimed in claim 17, wherein the data element in each said data group in the first source register and the second source register is a pair of data values representing a complex number and the data processing operation is a multiply-accumulate of complex numbers.

19. The data processing apparatus as claimed in claim 18, wherein the data processing instruction further specifies a rotation parameter, wherein the processing circuitry is responsive to the rotation parameter to perform the multiply-accumulate of complex numbers using a selected permutation of the data values and their signs which are subject to the data processing operation.

20. The data processing apparatus as claimed in claim 1, wherein the data processing operation is a logical operation.

21. A method of data processing comprising:
decoding a data processing instruction to generate control signals, the data processing instruction specifying in a plurality of registers: a first source register, a second source register, and an index,
wherein each of the first source register and the second source register has a size which is an integer multiple at least twice a predefined size of a data group, and each data group comprises a plurality of data elements; and
performing a data processing operation in response to the control signals with respect to each said data group in the first source register and the second source register to generate respective result data groups forming a result of the data processing operation,
wherein operands of the data processing operation for each said data group are a selected data element identified in the data group of the first source register by the index and each data element in the data group of the second source register, and
wherein each said data group of the first source register comprise an identical plurality of data elements.

22. A non-transitory computer-readable storage medium storing a program comprising at least one data processing instruction which when executed by a data processing apparatus causes:
generation of control signals in response to the data processing instruction, the data processing instruction specifying in a plurality of registers: a first source register, a second source register, and an index,
wherein each of the first source register and the second source register has a size which is an integer multiple at least twice a predefined size of a data group, and each data group comprises a plurality of data elements; and
performance of a data processing operation in response to the control signals with respect to each said data group in the first source register and the second source register to generate respective result data groups forming a result of the data processing operation,
wherein operands of the data processing operation for each said data group are a selected data element identified in the data group of the first source register by the index and each data element in the data group of the second source register, and
wherein each said data group of the first source register comprise an identical plurality of data elements.

23. A virtual machine provided by a computer program executing upon a data processing apparatus, said virtual machine providing an instruction execution environment corresponding to a data processing apparatus comprising:
register storage circuitry having a plurality of registers;
decoder circuitry responsive to a data processing instruction to generate control signals, the data processing instruction specifying in the plurality of registers: a first source register, a second source register, and an index,
wherein each of the first source register and the second source register has a size which is an integer multiple at least twice a predefined size of a data group, and each data group comprises a plurality of data elements; and
processing circuitry responsive to the control signals to perform a data processing operation with respect to each said data group in the first source register and the second source register to generate respective result data groups forming a result of the data processing operation,
wherein operands of the data processing operation for each said data group are a selected data element identified in the data group of the first source register by the index and each data element in the data group of the second source register, and
wherein each said data group of the first source register comprise an identical plurality of data elements.

* * * * *